(12) United States Patent
Bean

(10) Patent No.: US 10,895,918 B2
(45) Date of Patent: Jan. 19, 2021

(54) GESTURE RECOGNITION SYSTEM AND METHOD

(71) Applicant: IGT, Las Vegas, NV (US)

(72) Inventor: Andreas Bean, Graz (AT)

(73) Assignee: IGT, Las Vegas, NV (US)

(*) Notice: Subject to any disclaimer, the term of this patent is extended or adjusted under 35 U.S.C. 154(b) by 126 days.

(21) Appl. No.: 16/353,455

(22) Filed: Mar. 14, 2019

(65) Prior Publication Data

US 2020/0293114 A1 Sep. 17, 2020

(51) Int. Cl.
*G06F 3/0488* (2013.01)
*G06F 3/01* (2006.01)
*G06N 3/063* (2006.01)
*G06F 9/30* (2018.01)

(52) U.S. Cl.
CPC .......... *G06F 3/017* (2013.01); *G06F 3/04883* (2013.01); *G06F 9/3004* (2013.01); *G06N 3/063* (2013.01)

(58) Field of Classification Search
CPC .... G06F 3/017; G06F 9/3004; G06F 3/04883; G06N 3/063; A63F 13/10; A63F 13/53; A63F 13/57
See application file for complete search history.

(56) References Cited

U.S. PATENT DOCUMENTS

| | | | | |
|---|---|---|---|---|
| 6,222,465 B1 * | 4/2001 | Kumar | G06F 3/017 | 341/20 |
| 7,618,323 B2 * | 11/2009 | Rothschild | G07F 17/3209 | 463/12 |
| 7,815,507 B2 * | 10/2010 | Parrott | G10L 17/00 | 463/36 |
| 9,261,968 B2 * | 2/2016 | Yen | G06F 3/0346 | |
| 9,710,996 B2 * | 7/2017 | Keilwert | G07F 17/3209 | |
| 9,978,202 B2 * | 5/2018 | Keilwert | G06T 17/00 | |
| 10,290,176 B2 * | 5/2019 | Froy | G07F 17/3206 | |
| 2002/0140633 A1 * | 10/2002 | Rafii | G06F 3/04815 | 345/8 |
| 2005/0063564 A1 * | 3/2005 | Yamamoto | G06K 9/00355 | 382/104 |
| 2006/0136846 A1 * | 6/2006 | Im | G06F 3/017 | 715/863 |
| 2007/0259716 A1 * | 11/2007 | Mattice | G06F 3/0488 | 463/36 |
| 2009/0066641 A1 * | 3/2009 | Mahajan | A63F 13/10 | 345/156 |
| 2010/0226539 A1 * | 9/2010 | Ishii | G06F 3/0425 | 382/104 |
| 2012/0105613 A1 * | 5/2012 | Weng | G01C 21/3664 | 348/77 |
| 2012/0204133 A1 * | 8/2012 | Guendelman | G06F 3/017 | 715/863 |
| 2012/0322542 A1 * | 12/2012 | Chudd | G07F 17/3216 | 463/25 |

(Continued)

*Primary Examiner* — Phenuel S Salomon
(74) *Attorney, Agent, or Firm* — Sheridan Ross P.C.

(57) ABSTRACT

The present disclosure relates generally to computational devices and gesture recognition. A computational device may include instructions that determine, based on a parameterization for a portion of a symbol, complete predicted symbols. The complete predicted symbols may be used as an input for an application operating on the computational device.

20 Claims, 18 Drawing Sheets

(56) References Cited

U.S. PATENT DOCUMENTS

| | | | |
|---|---|---|---|
| 2013/0328763 A1* | 12/2013 | Latta | G06F 3/017 |
| | | | 345/156 |
| 2014/0267019 A1* | 9/2014 | Kuzmin | G06F 3/017 |
| | | | 345/156 |
| 2015/0363996 A1* | 12/2015 | Keilwert | G07F 17/3209 |
| | | | 463/31 |
| 2016/0202903 A1* | 7/2016 | Gutowitz | G06F 3/0484 |
| | | | 715/771 |
| 2020/0035016 A1* | 1/2020 | Muller | G06N 3/0454 |

* cited by examiner

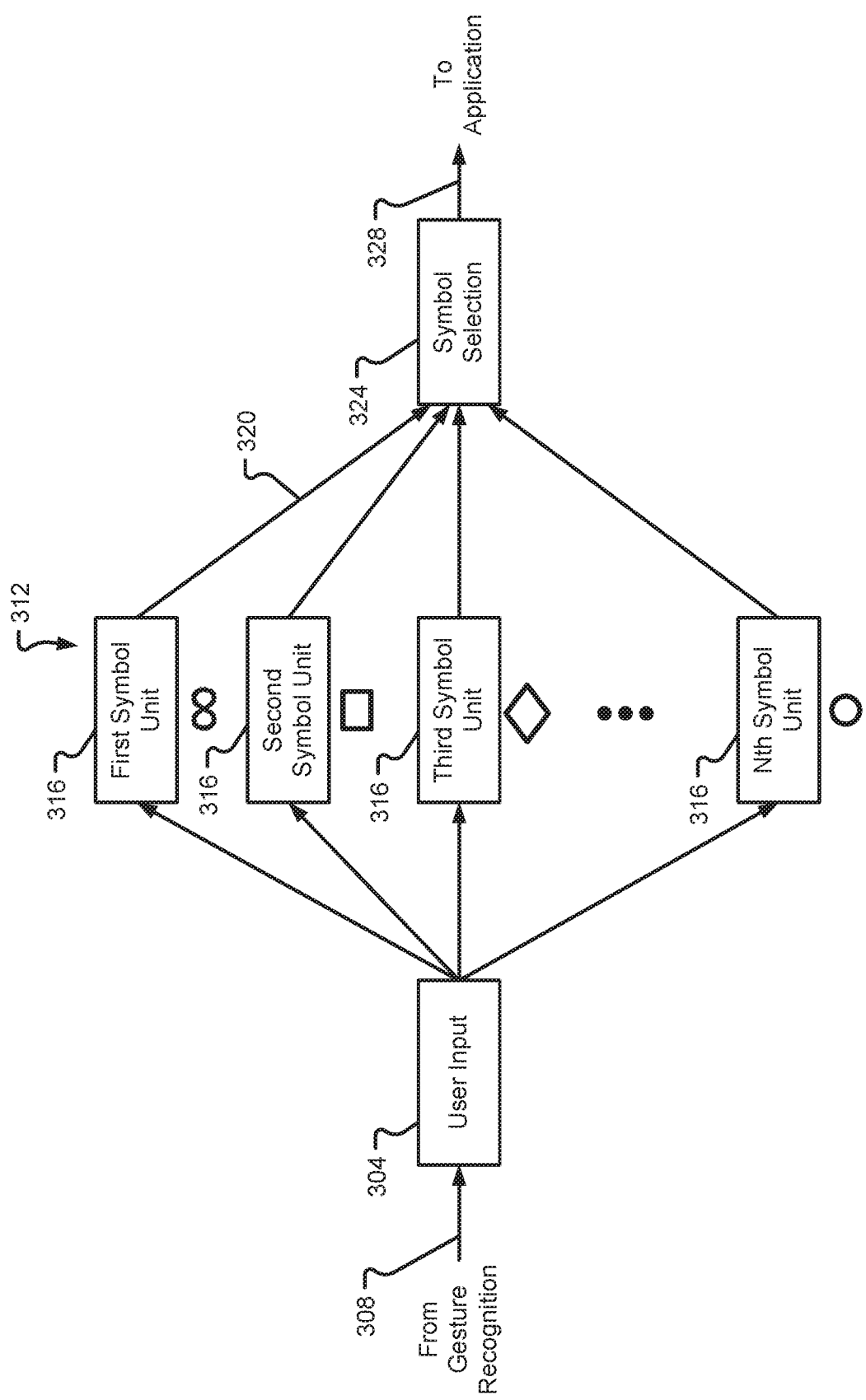

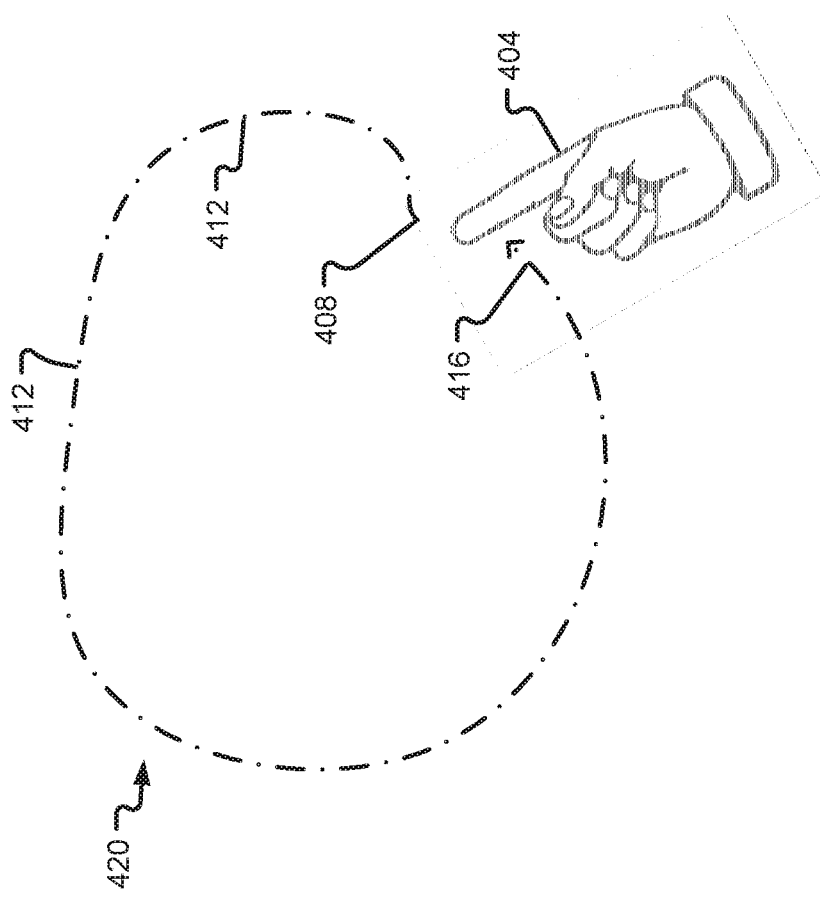

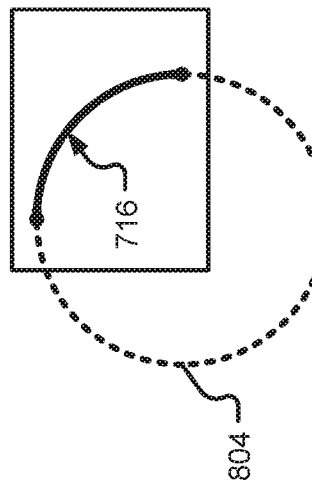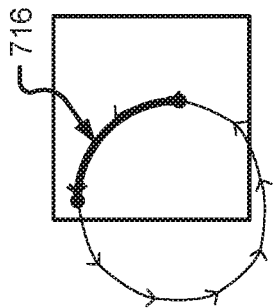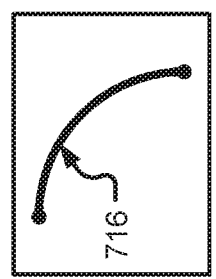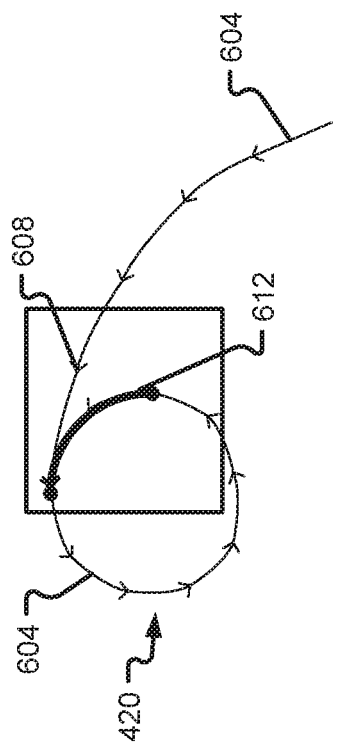
Fig. 8A
Fig. 8B
Fig. 8C
Fig. 8D

GESTURE RECOGNITION SYSTEM AND METHOD

BACKGROUND

The present disclosure is directed toward computational devices and, in particular, toward operating computational devices using gesture recognition.

Gaming devices often provide a variety of user inputs that enable the user to engage the gaming device in different ways. Examples of known user inputs include push buttons and touch-sensitive displays. A gaming device that provides additional user inputs beyond traditional push buttons and touch-sensitive displays can likely present a more enjoyable user experience and attract more player interaction.

BRIEF SUMMARY

In certain embodiments, the present disclosure relates to a method of operating a computational device, including: receiving, from a sensor device, location data points corresponding to movement of an object in three-dimensional space relative to the sensor device; determining, based on the location data points and with a processor, a first parameterization for a portion of a first symbol, wherein the first symbol corresponds to a first user input for the computational device; determining, based on the location data points and with the processor, a second parameterization for a portion of a second symbol, wherein the second symbol corresponds to a second user input for the computational device, wherein the first symbol is different from the second symbol, and wherein the first user input is different from the second user input; constructing, with the processor, a first complete predicted symbol based on the first parameterization; constructing, with the processor, a second complete predicted symbol based on the second parameterization; determining, with the processor, that the location data points more likely correspond to the first complete predicted symbol rather than the second complete predicted symbol; and causing an action to be taken with the computational device consistent with the first user input based on determining that the location data points more likely correspond to the first complete predicted symbol rather than the second complete predicted symbol.

In some embodiments, the present disclosure also relates to a system, including: a processor; a computer-readable storage medium, coupled with the processor, comprising instructions that are executable by the processor, wherein the instructions comprise: instructions that receive location data points corresponding to movement of an object in three-dimensional space relative to a sensor device; instructions that determine, based on the location data points, a first parameterization for a portion of a first symbol, wherein the first symbol corresponds to a first user input for a computational device; instructions that determine, based on the location data points, a second parameterization for a portion of a second symbol, wherein the second symbol corresponds to a second user input for the computational device, wherein the first symbol is different from the second symbol, and wherein the first user input is different from the second user input; instructions that construct a first complete predicted symbol based on the first parameterization; instructions that construct a second complete predicted symbol based on the second parameterization; instructions that determine that the location data points more likely correspond to the first complete predicted symbol rather than the second complete predicted symbol; and instructions that provide the first user input to the computational device based on determining that the location data points more likely correspond to the first complete predicted symbol rather than the second complete predicted symbol.

In some embodiments, the present disclosure also relates to a computational device that includes: a user interface comprising a user input and user output; a sensor device; a processor coupled with the user interface and with the sensor device; and a computer-readable storage medium, coupled with the processor, comprising instructions that are executable by the processor, wherein the instructions comprise: instructions that receive location data points corresponding to a gesture of a user provided relative to the sensor device; instructions that determine, based on the location data points, a first parameterization for a portion of a first symbol, wherein the first symbol corresponds to a first user input for the computational device; instructions that determine, based on the location data points, a second parameterization for a portion of a second symbol, wherein the second symbol corresponds to a second user input for the computational device, wherein the first symbol is different from the second symbol, and wherein the first user input is different from the second user input; instructions that construct a first complete predicted symbol based on the first parameterization; instructions that construct a second complete predicted symbol based on the second parameterization; instructions that determine that the location data points more likely correspond to the first complete predicted symbol rather than the second complete predicted symbol; and instructions that select the first user input as an input to an application based on determining that the location data points more likely correspond to the first complete predicted symbol rather than the second complete predicted symbol.

Additional features and advantages are described herein and will be apparent from the following Description and the figures.

BRIEF DESCRIPTION OF THE SEVERAL VIEWS OF THE DRAWINGS

FIG. 3A is a block diagram depicting components or sub-routines of instructions used for gesture recognition in accordance with embodiments of the present disclosure;

FIG. 4 is a first view of an object path being tracked relative to a sensor device in accordance with embodiments of the present disclosure;

FIG. 8A depicts a first view of a portion of a symbol in accordance with embodiments of the present disclosure;

FIG. 8B depicts the portion of the symbol overlaid against a complete predicted symbol for the portion of the symbol in accordance with embodiments of the present disclosure;

FIG. 8C depicts an object path relative to the portion of the symbol in accordance with embodiments of the present disclosure;

FIG. 8D depicts a modified object path in accordance with embodiments of the present disclosure;

DETAILED DESCRIPTION

Figure 1A:
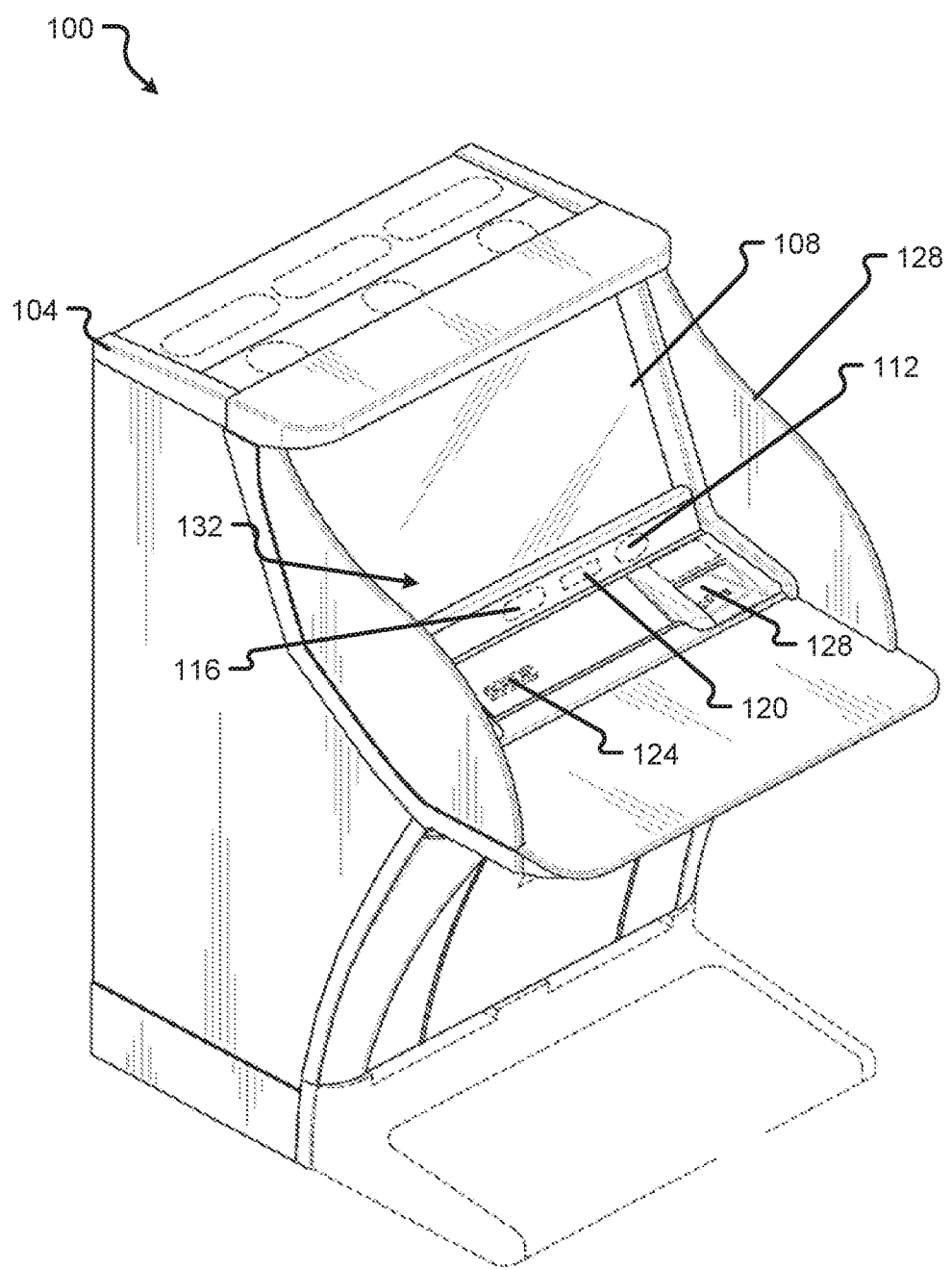
FIG. 1A depicts one example of a computational device in accordance with embodiments of the present disclosure.

Embodiments of the present disclosure will be described in connection with a computational device and, in particular, a computational device, such as a slot machine or Electronic Gaming Machine (EGM), that utilize gesture recognition as part of a user input for the computational device. While embodiments of the present disclosure will be described in connection with the example of a slot machine or EGM implementing the gesture recognition methods described herein, it should be appreciated that embodiments of the present disclosure are not so limited. For instance, other types of computational devices, such as portable user devices, smartphones, tablets, laptops, Personal Computers (PCs), wearable devices, etc. may be used to implement the gesture recognition methods.

There are a number of algorithms that focus on gesture recognition. Gesture recognition usually refers to the detection of special movements of an object or user appendage (e.g., a finger swiping left or swiping right across a touch-sensitive display). For ease of discussion, the term "object" will be used to reference any type of device (e.g., stylus, wand, ball, etc.) or user appendage (e.g., hand, finger, arm, eye, etc.) that can be tracked with a sensor device, such as an image sensor.

In general, gestures are dynamic short movements of an object. Instead of detecting gestures in the traditional sense, embodiments of the present disclosure attempt to detect symbols which are drawn by a continuous movement of an object in a three-dimensional space (e.g., finger in the air). A technical problem associated with trying to detect a symbol by tracking movement of an object in a three-dimensional space is that the drawing/movement of the object has no defined start or end point since the object cannot likely be switched on or off. Embodiments of the present disclosure help to solve these and other problems.

In some embodiments, a number of different neural network are trained individually for a number of different symbols. Each neural network can be used to predict a start and end point of an object in three-dimensional space. Once the starting and end point is known (or appropriately predicted), embodiments of the present disclosure can utilize a predicted symbol as a point of comparison to actual images captured of the object moving in the three-dimensional space and creating the complete symbol. Additionally, distortion parameters can be used and estimated by each neural network to account for the deformation of the user-drawn symbols, which are not likely to perfectly correspond to an expected symbol (e.g., a user is rarely capable of drawing a perfect circle with an object in three-dimensional space).

Embodiments of the present disclosure differ from previous gesture recognition methods. Specifically, by providing multiple neural networks, instead of a single neural network embodiments of the present disclosure can be used to select an appropriate portion of a continuous object movement. Prior solutions that only provide a single neural network classification approach would be unable to determine which part of the continuous movement should be selected as an input to the neural network. As an example, if a user draws an infinity symbol, the left and right part of the infinity symbol may appear as circles to a single neural network configuration. This illustrates the problem associated with selecting the correct portion of the continuous movement of the object. If only the left or right part of the object path were selected, then the classification would likely return a circle as the expected user input. On the other hand, if both the left and right portions of the object path were selected, then an infinity symbol could be recognized. This kind of portion selection problem is solved by embodiments of the present disclosure.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

Figure 1B:
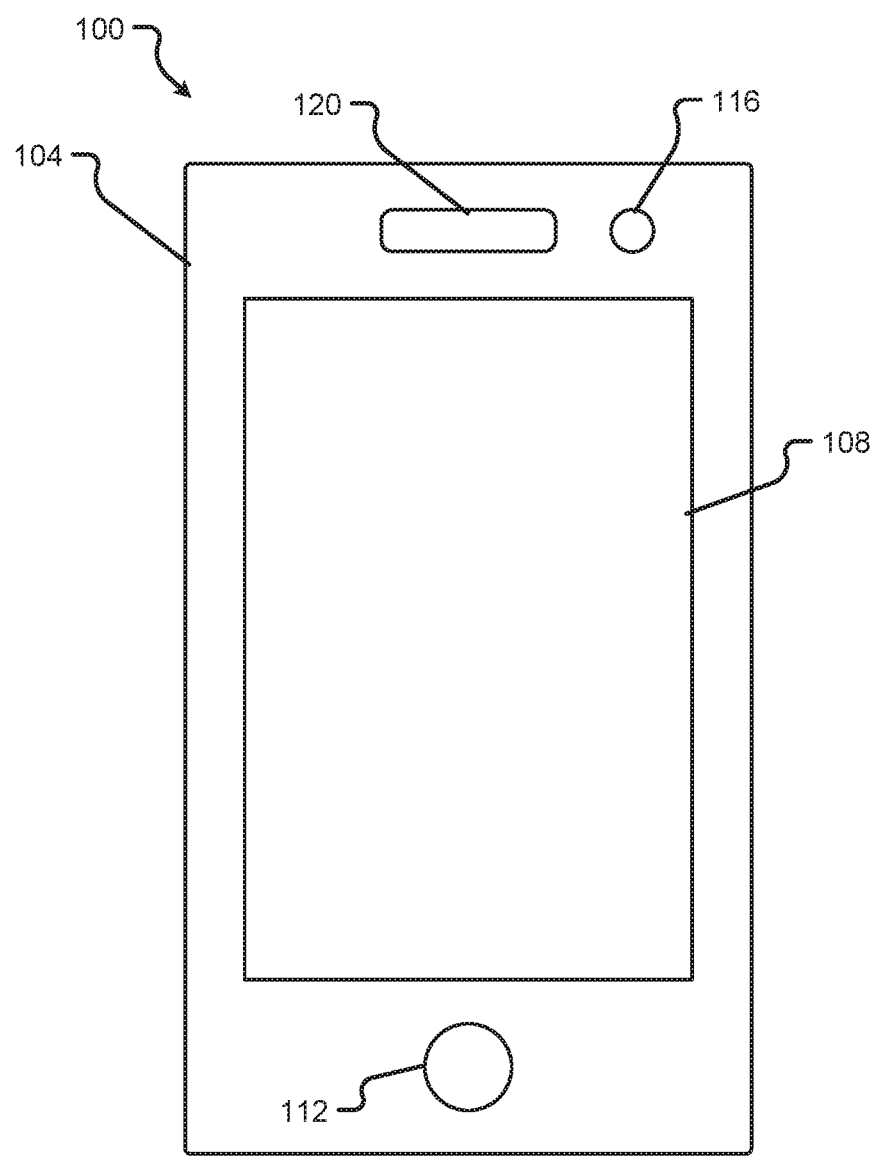
FIG. 1B depicts another example of a computational device in accordance with embodiments of the present disclosure.

With reference now to FIGS. 1A and 1B, an illustrative computational device 100 that may be used to implement user gesture recognition will be described in accordance with at least some embodiments of the present disclosure. A computational device 100 may include a portable or non-portable device used for executing a gaming application or multiple different gaming applications without departing from the scope of the present disclosure. Of course, a computational device 100 does not necessarily have to implement a gaming application. Rather, a computational device may correspond to any device that operates on user inputs received by object tracking in a three-dimensional space. Non-limiting examples of a computational device include a EGM, a VGM, a mobile communication device (e.g., a smartphone, laptop, wearable device, etc.), a laptop, a PC, etc. An EGM or VGM-type of computational device 100 is shown in FIG. 1A in accordance with embodiments of the present disclosure.

The illustrative computational device 100 of FIG. 1A is shown to include a support structure 104, housing or cabinet, which provides support for a plurality of displays 108, inputs 112, 116, 120, controls, and other features of a conventional gaming machine. In the illustrated embodiment, a player plays computational device 100 while sitting, however, the computational device 100 is alternatively configured so that a player can operate it while standing or sitting. The illustrated computational device 100 is positioned on the floor but can be positioned alternatively (i) on a base or stand, (ii) as a pub-style table-top game (e.g., where the participant computational devices are located remotely from the shared wheel as discussed below), (iii) as a stand-alone computational device on the floor of a casino with other stand-alone computational devices, or (iv) in any other suitable manner. The computational device 100 can be constructed with varying cabinet and display configurations.

In one embodiment, a computational device 100 is configured to randomly generate awards and/or other game outcomes based on probability data. Since a computational device 100 generates outcomes randomly or based upon a probability calculation, there is no certainty that the computational device 100 will provide the player with any specific award or other game outcome.

In some embodiments, a computational device 100 may employ a predetermined or finite set or pool of awards, progressive awards, prizes or other game outcomes. As each award or other game outcome is provided to the player, the computational device 100 removes the provided award or other game outcome from the predetermined set or pool. Once removed from the set or pool, the specific provided award or other game outcome cannot be provided to the player again. The computational device 100 provides players with all of the available awards or other game outcomes over the course of the play cycle and guarantees a designated amount of actual wins and losses.

The computational device 100 may include one or more displays 108. An illustrative display 108 may include a light emitting diode (LED) panel, an organic LED (OLED) panel, a liquid crystal display (LCD), or any other type of device that is capable of rendering images for display to a user of the computational device 100. In some embodiments, the display 108 may correspond to a touch-sensitive display. The display 108 may also include other types of devices that can present information to a user via a plurality of pixels. In general, the display 108 corresponds to a particular type of visual output device. Although not depicted, the computational device 100 may further include other types of output devices, such audio output devices (e.g., speakers, buzzers, etc.), tactile output devices (e.g., haptic feedback systems, vibration motors, etc.), or any other known transducer that is configured to convert an electrical signal into a physical property capable of being sensed by a user.

In addition to the display 108, the computational device 100 may include a number of different input devices 112, 116, 120. In some embodiments, the computational device 100 may include a biometric sensor device 112, an image sensor device 116, and an audio input device 120. The image sensor device 116 may include any type of imaging device, such as a camera, an image sensor, a CMOS-based image sensor, a CCD-based image sensor, etc. Thus, the image sensor device 116 may include one or more photo-sensitive diodes that convert optical energy into an electrical signal. The image sensor device 116 may be used to detect motion of an object in a three-dimensional space 132 that is positioned within a field of view of the image sensor device 116. As will be discussed in further detail herein, the image sensor device 116 may be configured to capture a plurality of images of an object in the three-dimensional space 132 that is somewhere in front of and separate from the display device 108. In the depicted embodiment, the computational device 100 is shown to include a privacy screen 128 to help hide a user's gestures provided in the three-dimensional space 132. A computational device 100 does not necessarily need to be provided with the privacy screens 128, but such screens may be used to help define the three-dimensional space 132 and to protect a user's privacy when interacting with the computational device 100.

The biometric sensor device 112 may include a number of image sensors or may be integrated with the image sensor device 116. In some embodiments, the biometric sensor device 112 may correspond to a particular type of image sensor device that is used to detect or sense a biometric feature of a user. For instance, the biometric sensor device 112 may be used to detect a user's fingerprint, retina, ear lobe, facial features, etc. In other words, the biometric sensor device 112 may correspond to a particular input of the computational device 100 that is used to detect one or more biometric features of a user, perhaps as part of authenticating a user and enabling certain features of the computational device 100.

The audio input device 120 may correspond to one or more transducers that convert audible sounds (e.g., sound waves) into an electrical signal. In some embodiments, the audio input device 120 may correspond to a microphone, a pressure sensor, or the like. Any device or collection of devices that is capable of sensing a sound wave and converting the sound wave into an electrical signal may be provided as an audio input device 120.

The computational device 100 is also shown to include at least one payment acceptor. Illustrative payment acceptors may include, without limitation, a coin slot 124, where the player inserts coins or tokens, and a ticket, note or bill acceptor 128, where the player inserts a bar-coded ticket, note, or cash. In one embodiment, the note or bill acceptor 128 may also be configured as a player-tracking card, credit card, debit card or data card reader/validator. In such an embodiment, the acceptor 128 may operate as a more generic type of document reader rather than a particular type of document reader, such as a ticket, note, or bill acceptor.

In one embodiment, a player inserts an identification card into acceptor 128 of computational device 100. The identification card can be a smart card having a programmed microchip or a magnetic strip coded with a player's identification, credit totals and other relevant information. In one embodiment, money may be transferred to computational device 100 through an electronic fund transfer and acceptor 128 using the player's credit, debit or smart card. When a player funds computational device 100, a processor of the computational device 100 may determine the amount of funds entered and the corresponding amount is shown on the credit or other suitable display 108 as described above.

FIG. 1B illustrates another example of a computational device 100 in accordance with at least some embodiments of the present disclosure. This particular example of computational device 100 may correspond to a portable computational device 100 such as a mobile smartphone, tablet, wearable, etc. The computational device 100 may be owned by a user of the device 100 rather than being owned by a casino operator.

The computational device 100 again includes a support structure 104, a display 108, one or more input devices 112, 116, 120. In some embodiments, the display 108 may correspond to a touch-sensitive display screen, meaning that the display 108 is simultaneously capable of displaying information (e.g., in connection with game play activity) and receiving a touch-based user input on the two-dimensional surface of the display 108. In some embodiments, the touch-sensitive display 108 may provide game features similar to a cabinet-style computational device 100 without requiring all of the dedicated buttons provided by a cabinet-style computational device 100. As will be discussed in further detail herein, user gestures or inputs recognized at the two-dimensional display 108 may be different from user gestures recognized by tracking motion of an object in a three-dimensional space 132 that is positioned in front of the display 108.

Figure 2:
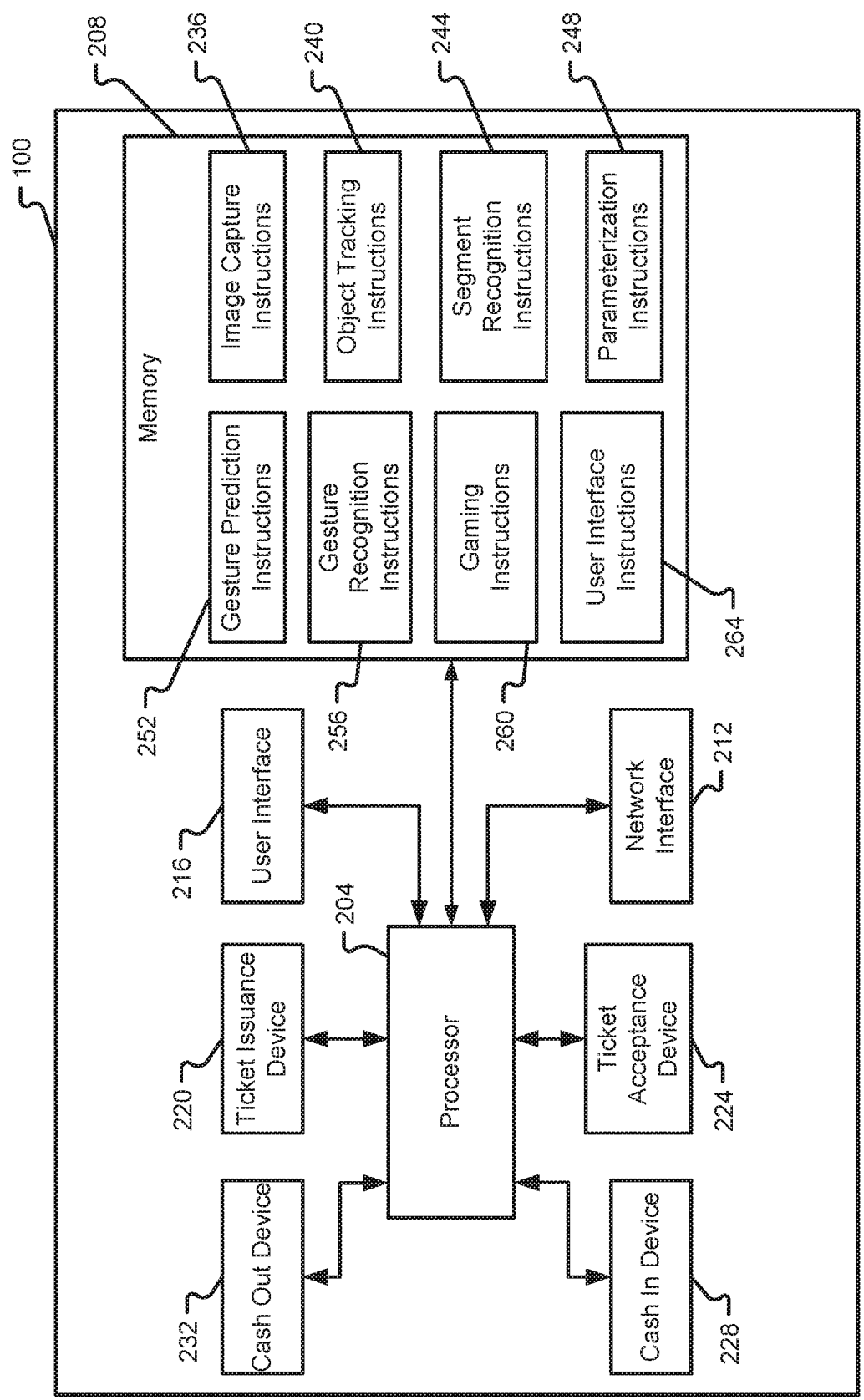
FIG. 2 is a block diagram depicting components of a computational device in accordance with embodiments of the present disclosure.

With reference now to FIG. 2, additional details of the components that may be included in a computational device 100 will be described in accordance with at least some embodiments of the present disclosure. The computational device 100 is shown to include a processor 204, memory 208, a network interface 212, and a user interface 216. In some embodiments, the processor 204 may correspond to one or many microprocessors, CPUs, microcontrollers, Integrated Circuit (IC) chips, or the like. The processor 204 may be configured to execute one or more instruction sets stored in memory 208. In some embodiments, the instruction sets stored in memory 208, when executed by the processor 204, may enable the computational device 100 to provide game play functionality or any other type of desired functionality.

The nature of the network interface 212 may depend upon whether the network interface 212 is provided in cabinet-style computational device 100 or a mobile computational device 100. Examples of a suitable network interface 212 include, without limitation, an Ethernet port, a USB port, an RS-232 port, an RS-485 port, a NIC, an antenna, a driver circuit, a modulator/demodulator, etc. The network interface 212 may include one or multiple different network interfaces depending upon whether the computational device 100 is connecting to a single communication network or multiple different types of communication networks. For instance, the computational device 100 may be provided with both a wired network interface 212 and a wireless network interface 212 without departing from the scope of the present disclosure.

The user interface 216 may include a combination of the user input and user output devices described in connection with FIGS. 1A and 1B. For instance, the user interface 216 may include the display 108 and the user input devices 112, 116, 120. The user interface 216 may also include one or more drivers for the various hardware components that enable user interaction with the computational device 100.

The memory 208 may include one or multiple computer memory devices that are volatile or non-volatile. The memory 208 may be configured to store instruction sets that enable player interaction with the computational device 100 and that enable game play at the computational device 100. The memory 208 may also be used to store instructions or computer code that enables user gestures detected within the three-dimensional space 132 to be converted to a recognizable symbol, which is then useable to control operations of the computational device. Examples of instruction sets that may be stored in the memory 208 include an image capture instruction set 236, an object tracking instruction set 240, a segment recognition instruction set 244, a parameterization instruction set 248, a gesture prediction instruction set 252, a gesture recognition instruction set 256, a gaming instruction set 260, and a user interface instruction set 264. In addition to the instruction sets, the memory 208 may also be configured to store a random number generator that is used by the gaming instruction set 260, for example, to provide game outputs.

One, some, or all of the instruction sets shown as being stored in memory 208 may correspond to an executable set of instructions that perform a predetermined function on defined inputs and then produce one or more outputs based on the predetermined function. Alternatively or additionally, one, some, or all of the instruction sets shown as being stored in memory 208 may be provided as a neural network or similar type of artificial intelligence engine that is not explicitly programmed to perform a routine. Rather, when implemented as a neural network or artificial intelligence engine, the routines stored in memory 208 may be stored as an algorithm that is trained with a large data set. The instructions stored in memory 208 may be trained using deep learning techniques, decision tree learning techniques, inductive logic programming, clustering, reinforcement learning, and/or Bayesian networks.

In some embodiments, the gaming instruction set 260, when executed by the processor 204, may enable the computational device 100 to facilitate one or more games of chance or skill and produce interactions between the player and the game of chance or skill. In some embodiments, the gaming instruction set 260 may include subroutines that present one or more graphics to the player via the user interface 216, subroutines that calculate whether a particular wager has resulted in a win or loss during the game of chance or skill, subroutines for determining payouts for the player in the event of a win, subroutines for exchanging communications with another device, such as a server, subroutines for determining bonus spin opportunities during game play, and any other subroutine useful in connection with facilitating game play at the computational device 100.

The image capture instruction set 236, when executed by the processor 204, may enable the computational device 100 to capture one or multiple images of an object in the three-dimensional space 132 using the image sensor device 116. The image capture instruction set 236 may also enable the plurality of images to be sequenced together to enable the object tracking instruction set 240 to determine a motion of an object in the three-dimensional space 132. In some embodiments, the object tracking instruction set 240 may be configured to determine location data points for the object moving through the three-dimensional space 132 and may further be configured to convert the location data points for the object over time into a defined object path. As will be discussed in further detail herein, the object path that is produced by the object tracking instruction set 240 may be processed with other instruction sets in memory 208 to identify a user gesture in the three-dimensional space 132. In some embodiments, the instruction sets that process the object path and its related information may be configured to detect a portion or segment of the object path that can be used for gesture recognition while discarding or ignoring other portions of the object path.

In some embodiments, the segment recognition instruction set 244 and parameterization instruction set 248, when executed by the processor 204, may enable the computational device 100 to detect and recognize segments or portions of an object's path that will be provided to the gesture recognition instruction set 256. In some embodiments, the selected segments or portions of the object path (e.g., as defined by location data points output by the object tracking instruction set 240) may be provided to the gesture recognition instruction set 256 as a parameterization of the location data points. The parameterization instruction set 248 may be configured to generate the parameterization of the location data points that is eventually provided to the gesture recognition instruction set 256.

In some embodiments, the gesture recognition instruction set 256 may cooperate with the gesture prediction instruction set 252 to determine, with some probability, whether a detected predicted symbol corresponds to the desired gesture of the user. For instance, the gesture recognition instruction set 256 may be configured to perform the final gesture recognition function, but may do so with the assistance of the gesture prediction instruction set 252. In some embodiments, the combination of the segment recognition instruction set 244, parameterization instruction set 248, gesture prediction instruction set 252, and gesture recognition instruction set 256 may be used to convert the location data points received from the object tracking instruction set 240 into an output that is useable by the gaming instruction set 260 or any other application stored in memory 208. The interaction of these various instruction sets or subroutines thereof will be shown and described in connection with FIG. 3. In some embodiments, these various instruction sets may be configured to start a classification when the symbol is closed (e.g., when the object crosses an already drawn line in the three-dimensional space 132). While this may work very well for simple symbols like the circle, rectangle, triangle and so on, such methods may fail for the infinity symbol or other more complicated symbols. Specifically, for the infinity symbol, the left or the right part of the infinity would likely be mistakenly detected as a circle.

To overcome the problem of selecting the correct part of the continuous trail, the operation of the instruction sets 244, 248, 252, 256 may be modified. First, there is no single network to classify the input image, instead may be one neural network per symbol. Each network may trained to recognize parts of that symbol. Assuming that the network is able to predict which part of the symbol matches the drawing, then it becomes possible to determine (or predict) how the completed symbol would look like and it becomes further possible to generate predicted symbols with each of the neural network. In other words, in a first step only a fraction of the currently drawn trail is selected. In some embodiments, this is ⅓ to ¼ of the complete symbol. In some embodiments, the segment recognition instruction set 244 can select a segment or portion of an object's path that starts from the current object position and goes back in time until either a maximum length is reached, or a maximum curvature is exceeded, or both. In a second step, this path is presented to each of the neural networks to allow each neural network to predict parameters which allow to predict the complete symbol. Based on these parameters (e.g., a parameterization of the symbol), the complete predicted symbol is constructed and its length may be calculated, likely by the gesture prediction instruction set 252. Third, from the original object path, a subsection is cut out which has exactly the length of the predicted symbol. Finally, this selected path is compared to the predicted one. This comparison may be done at the gesture recognition instruction set 256, which may also calculate a difference measure. If the value is below a given threshold it is reported to the application, in this specific case to the gaming instruction set 260.

In some embodiments, the gaming instruction set 260 may utilize the inputs received from the gesture recognition instruction set 256 (e.g., in the form of a symbol representing a user input) and derive an output or gaming behavior for the computational device 100. The output or gaming behavior may be presented to the user of the device based on rendering rules controlled by the user interface instruction set 264. For instance, the user interface instruction set 264 may correspond to a driver for the display 108 or some other output element of the user interface 216.

The computational device 100 is further shown to include a ticket issuance device 220, a ticket acceptance device 224, a cash in device 228, and a cash out device 232. The ticket issuance device 220 may be configured to receive physical tickets, vouchers, or player loyalty cards. In some embodiments, the ticket issuance device 220 and ticket acceptance device 224 may operate in concert with the acceptor 128. In such an embodiment, the acceptor 128 may correspond to the physical components that receive and issue a ticket or voucher whereas the ticket acceptance device 224 and ticket issuance device 220 correspond to the drivers and/or firmware components that control operation of the acceptor 128.

Similarly, the cash in device 228 and cash out device 248 may include or operate in concert with the coin slot 124 and any coin delivery mechanisms. The cash in device 228 and cash out device 248 may include hardware, drivers, or firmware that facilitate receiving or distributing cash, tokens, bills, etc. In some embodiments, the cash in device 228 may be configured to determine an amount of cash (e.g., in coins, bills, etc.), an amount of tokens, etc., input at the coin slot 124 and convert the values into credits for playing games with the game instruction set 220. The cash out device 248 may correspond to hardware and software configured to output coins, tokens, bills, etc. if a player decides to cash out or convert playing credits back into cash, tokens, bills, etc.

Figure 3B:
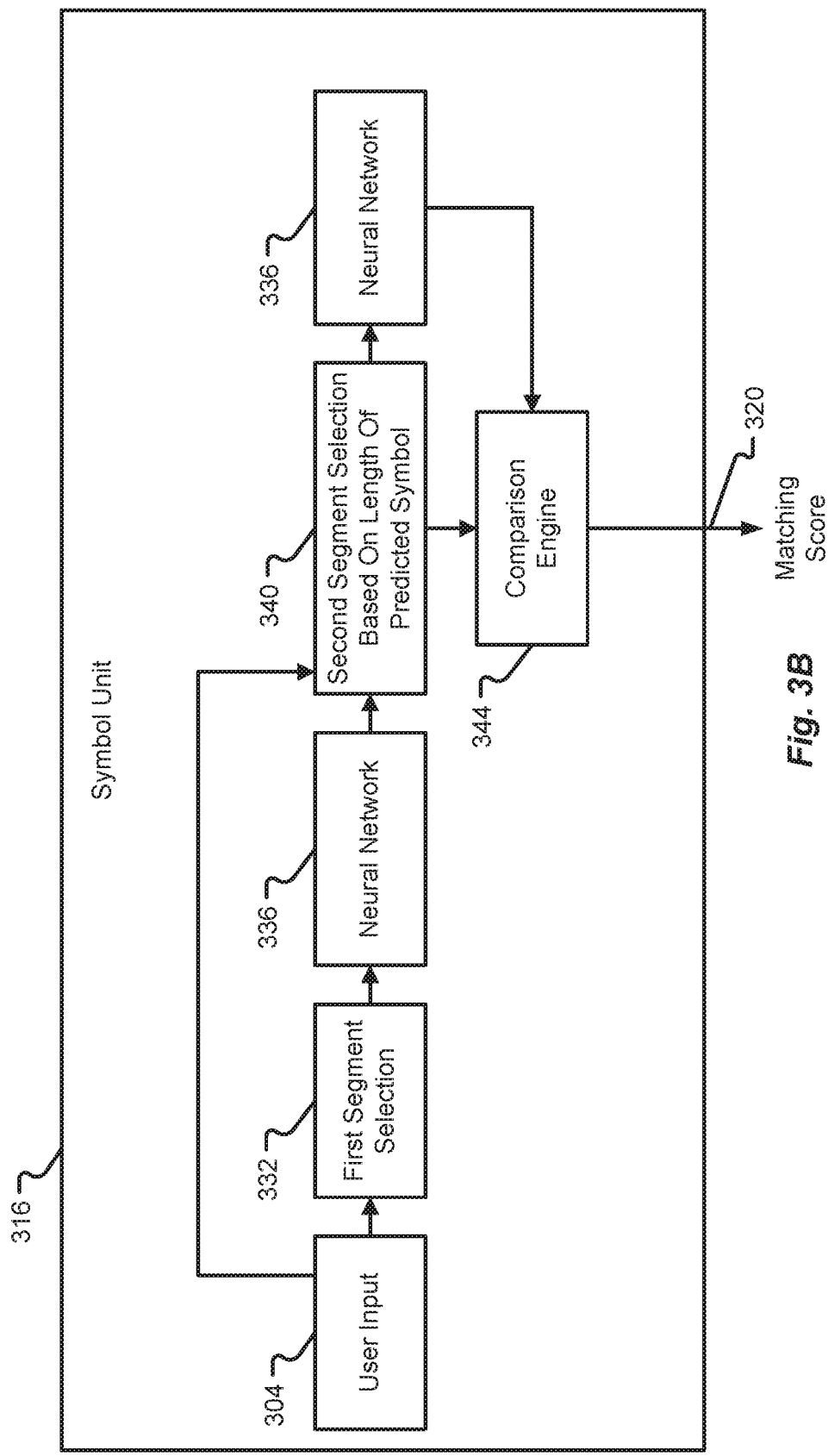
FIG. 3B is a block diagram depicting details of a symbol unit in accordance with embodiments of the present disclosure.

With reference now to FIGS. 3A and 3B, additional details of the components used to perform gesture recognition and provide a useable output for an application of the computational device 100 will be described in accordance with at least some embodiments of the present disclosure.

As discussed above, embodiments of the present disclosure contemplate the use of a neural network or multiple neural networks to detect a user input vis-à-vis motion of an object in a three-dimensional space 132. In some embodiments, a plurality of neural networks can be used to predict a complete symbol for a given fraction of the symbol. Contrary to the straight-forward image classification attempts, where the training data is the real drawings of several humans, the training data for the image completion of the various neural networks 316 used herein may be generated by a computer. To make such a situation work, suitable parameters may be defined to describe a fraction of a symbol. The images of the parts of the symbols together with the parameters may be used to build the training data set. As a non-limiting example, as shown in FIGS. 7A and 7B, a symbol 704, such as a circle, may be parameterized, meaning that portions or segments 716 of the symbol 704 can be described by point locations 708 in a three-dimensional space 132 and/or parameter values 712.

Figure 7B:
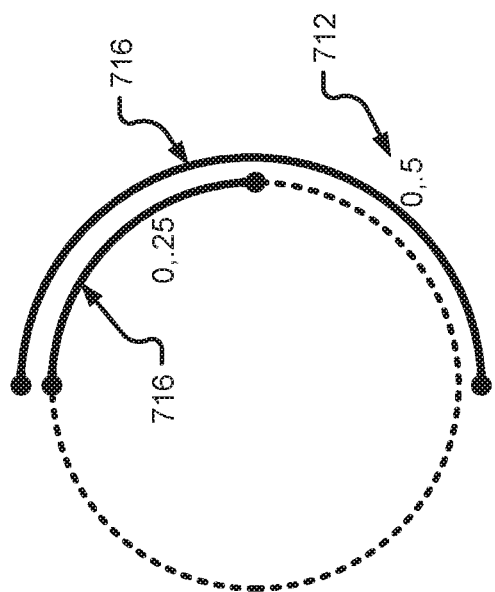
FIG. 7B is a schematic view of portions of a parameterized symbol in accordance with embodiments of the present disclosure.
Figure 7A:
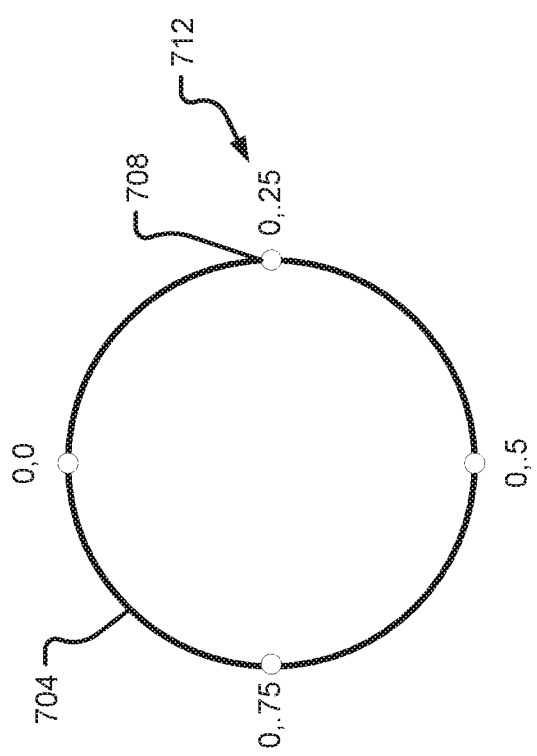
FIG. 7A is a schematic view of a parameterized symbol in accordance with embodiments of the present disclosure.

The example of FIGS. 7A and 7B show portions 716 having at least two parameters to describe a section of the symbol's 704 outline. One parameter may be used to specify the starting point of the portion 716 (e.g., the left parameter of "0") for both portions 716. Another parameter may be used to specify the length of the segment, where the length of the whole circumference of the symbol 704 in the example of FIGS. 7A and 7B is equal to "1." Thus, a portion 716 corresponding to a quarter of the symbol 704 is shown to have parameter values 712 of (0, 0.25) and a portion 716 corresponding to half of the symbol 704 is shown to have parameter values 712 of (0, 0.5). It should be appreciated that these illustrative parameterizations of the symbol 704 are not intended to limit embodiments of the present disclosure. Furthermore, although a portion 716 of a symbol 704 is only shown to have two parameters as part of its parameterization, it should be appreciated that a portion 716 may be parameterized to have two, three, four, or more parameter values that describe the portion 716. Non-limiting examples of parameter values that may be used to describe a portion 716 of a symbol 704 include: point of origin in the three-dimensional space 132, point of termination in the three-dimensional space 132, length of the portion, arc of the portion, radius of the portion, number of curves of the portion, number of intersections with other portions, angles between portions, number of vertices in the portion, number of angles in the portion, or combinations thereof. In some embodiments, it may also be possible to provide a parameter value as part of the parameterization 712 that includes a reference to another (perhaps adjacent) portion 716. Non-limiting examples of such parameter values may include: angles between portions, distance between portions, points of intersection between portions, number of intersections between portions, shared planes between portions, etc.

Referring back to FIGS. 3A and 3B, gesture recognition may be performed by a combination of different components. In some embodiments, the components used to perform gesture recognition may include a plurality of different symbol units 316 that are specifically configured to recognize a symbol of a particular type. In some embodiments, each symbol unit 316 may comprise one or more neural networks that are trained with unique training datasets, each training dataset being specific to the type of symbol to be recognized (e.g., via parameterization) by that symbol unit. In the depicted embodiment, a plurality of symbol units 312 may include different unique symbol units 316 that are trained to recognize different symbols (e.g., infinity symbols, square symbols, diamond symbols, circle symbols, triangle symbols, trapezoid symbols, crown symbols, rectangle symbols, oval symbols, octagon symbols, arrow symbols, letter-based symbols, number-based symbols, or any other type of symbol). During training of the neural networks within the symbol units 316, the parameters may be chosen randomly and the images may be generated and stored along with the two parameters which are the labels. A training dataset may include between 5,000 and 10,000 or more images. Based on this training dataset, each symbol unit 316 may have its various neural networks trained. After a symbol unit 316 has its neural networks appropriately trained, the neural network can organized and configured to predict the parameter values for the symbol. If the symbol unit 316 is properly trained, then it should be capable of outputting a parameterization that almost nearly matches a computer-generated full symbol.

Operation of the components depicted in FIG. 3A will now be explained. Specifically, location data points are received from the object tracking instruction set 240 and are provided from gesture recognition 308 as a user input 304. The user input 304 may correspond to any user input detected within the three-dimensional space 132. The user input 304 may be provided to each of the symbol units 316 in parallel, thereby enabling the plurality of symbol units 316 to simultaneously process the user input 304. As will be discussed in further detail with reference to FIG. 3B, each symbol unit 316 may be configured to output a unique output 320 that is provided to a symbol selection engine 324. In some embodiments, the output 320 generated by a particular symbol unit 316 may correspond to a matching score that represents how well (or with what degree of confidence) the user input 304 corresponds to the unique symbol type being analyzed by the particular symbol unit 316.

For instance, the first symbol unit 316 may correspond to a symbol unit 316 configured to recognize the infinity symbol. The first symbol unit 316 will output a matching score 320 representing the first symbol unit's 316 confidence that the user input 304 corresponds to the infinity symbol. If the matching score 320 meets or exceeds a predetermined threshold value, then the symbol selection instructions 324 will generate an output 328 for delivery to an application that includes the infinity symbol. In other words, the infinity symbol will be provided as an input to the application. As another example, another symbol unit 316 configured to recognize the diamond symbol will process the same user input 304 that was provided to the infinity symbol unit 316. The diamond symbol unit 316 will process the user input 304 and output its own matching score 320 representing the diamond symbol unit's 316 confidence that the user input 304 corresponds to the diamond symbol. If the symbol selection engine 324 determines that the matching score 320 received from the diamond symbol unit 316 meets or exceeds the predetermined threshold value, then the symbol selection instructions 324 will generate an output 328 that includes the diamond as an output symbol 328 for the application.

In some embodiments, rather than comparing each matching score 320 received from each symbol unit 316 to a single predetermined threshold value, the symbol selection engine 324 may be configured to compare the matching scores 320 from each symbol unit 316 with one another and then produce an output 328 based on the highest matching score 320 and the symbol unit 316 from which the highest matching score 320 was received. For example, if the matching score 320 from the circle symbol unit 316 and the matching score 320 from the infinity symbol unit 316 don't exceed the predetermined threshold value, the symbol selection engine 324 may still output one of the circle or infinity symbols as an output 328 depending upon which symbol unit 316 produced a higher matching score 320.

With reference now to FIG. 3B, additional details and operations of the various symbol units 316 will be described in accordance with at least some embodiments of the present disclosure. As shown in FIG. 3B, each symbol unit 316 may include one, two, three, or more neural networks 336. Each of the neural networks 336 within a particular symbol unit 316 correspond to the same (e.g., a copy) neural network or a similar neural network. In other words, the multiple neural networks 336 within a symbol unit 316 may have the same format and may have been trained with the same training dataset. This causes each neural network 336 to predict a particular symbol type (e.g., infinity, circle, square, diamond, oval, etc.) based on the user input 304 received.

In some embodiments, the user input 304 is provided to both a first segment selection process 332 and a second segment selection process 340. The first segment selection process 332 may be configured to select a first segment of the user input 104 based on a particular feature or characteristic of the location data points contained in the user input 104. For instance, the first segment selection process 332 for a circle symbol unit 316 may be configured to select a first segment based on a curvature of a path. The segment selected by the first segment selection process 332 may be provided to the first neural network 336, which predicts the complete symbol (particular to the symbol unit 316) based on the segment received from the first segment selection process 332.

The output of the first neural network 336 (e.g., a predicted complete symbol) may be provided to the second segment selection process 340. In some embodiments, the second segment selection process 340 also receives the user input 304. The second segment selection process 340 may be configured, based on the inputs provided thereto, to make a second segment selection based on a length of the predicted symbol received from the first neural network 336.

The output of the second segment selection process 340 may be provided in parallel to both a comparison engine 344 and a second instance of the neural network 336 (which may actually be the same neural network as the first neural network 336). The second instance of the neural network 336 may process the output received from the second segment selection process 340 and output a predicted symbol based on the larger segment selected by the second segment selection process 340.

The comparison engine 344 may then compare the output of the second instance of the neural network 336 (e.g., a predicted complete symbol) with the larger segment selected by the second segment selection process 340. Based on this comparison, the comparison engine 344 may generate a matching score 320 that describes, as a scalar value, the closeness of the predicted complete symbol with the larger segment selected by the second segment selection process 340.

Figure 5:
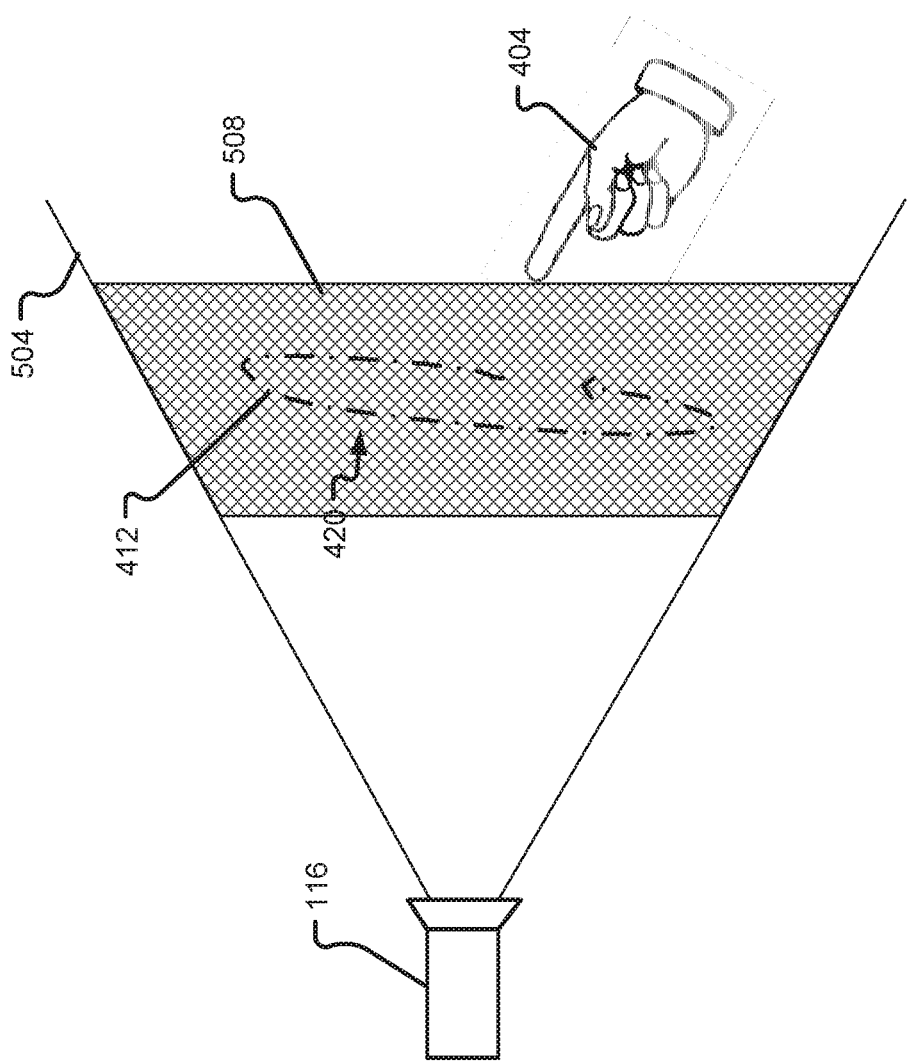
FIG. 5 is a second view of an object path being tracked relative to a sensor device in accordance with embodiments of the present disclosure.

With reference now to FIGS. 4 and 5, the physical space in which a motion of an object 404 is detected relative to the computational device 100 will be described in accordance with at least some embodiments of the present disclosure. FIG. 4 depicts a motion of an object 404 that is determined to follow an object path 420 from a first perspective (e.g., a perspective facing toward the display 108 and defining an x-y plane that is substantially parallel with the plane of the display 108). FIG. 5 depicts a side view of the object path 420 that is perpendicular to the view of FIG. 4 (e.g., viewing the object 404 from a y-z plane). In some embodiments, the object path 420 may be entirely within the three-dimensional space 132, which may also be referred to as a gesture recognition volume 508. The position, size, and range of the three-dimensional space 132 that defines the gesture recognition volume 508 may be dependent upon the type of image sensor device 116 used to capture images of the object 404 as well as a field of view 504 of the image sensor device 116. In some embodiments, the images captured by the image sensor device 116 may be translated to a two-dimensional set of location data points (e.g., data points solely in the x-y plane) even though the gestures recognition volume 508 is a three-dimensional space 132.

An object path 420 is shown to have an origination point 408, a termination point 416, and a plurality of additional location data points 412 that connect the origination point 408 with the termination point 416. In some embodiments, some or all of the location data points 412 in the x-y plane may be determined by the object tracking instruction set 240 and provided to the segment recognition instruction set 244 for analysis in connection with determining an intended symbol or user input based on the object path 420.

Figure 6:
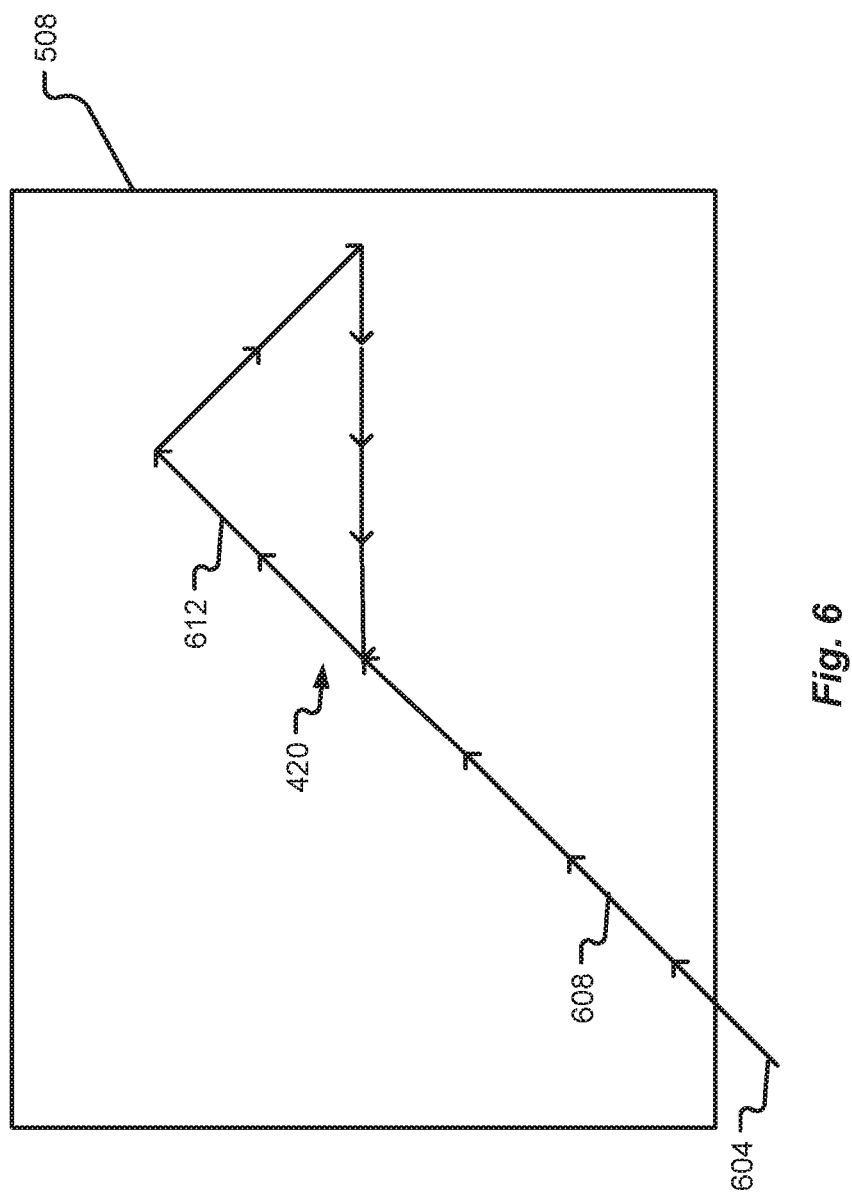
FIG. 6 is a schematic view of an illustrative object path in accordance with embodiments of the present disclosure.

As can be seen in FIG. 6, an object path 420 may begin outside the gesture recognition volume 508, but may track into the gesture recognition volume 508. After entering the gesture recognition volume 508, the object path 420 may begin a movement that is intended by the user to correspond to an input symbol. In some embodiments, the object path 420 may include an external portion 604, an internal ignorable portion 608, and a symbol portion 612. The external portion 604 may correspond to a portion of the object path 420 that is outside the gesture recognition volume 508. The internal ignorable portion 608 may correspond to a portion of the object path 420 that is inside the gesture recognition volume 508, but is not intended by the user to correspond to the symbol drawn by the user. The symbol portion 612 may correspond to a portion of the object path 420 that is inside the gesture recognition volume 508 and is intended by the user to correspond to the symbol drawn by the user. As can be appreciated, the symbol portion 612 may include a plurality of portions 716 or segments that can be analyzed by the symbol units 316. A technical problem, however, is enabling the segment recognition instruction set 244 to differentiate between the symbol portion 612 and the internal ignorable portion 608.

Each symbol unit 316 as described herein above, may include one or more neural networks 336 and segment selection processes 332, 340, which in some embodiments may correspond to LeNet-based neural networks. These various neural networks and/or processes may be trained with the training dataset as described above and may be configured to predict a different symbol from the other neural networks 336. Because it is difficult to understand where the object path 420 transitions from the internal ignorable portion 608 to the symbol portion 612, the different neural networks 336 are enabled to predict a complete symbol in a way that is best-suited for a particular symbol unit 316 (and not necessarily best suited for other symbol units 316). Using the example of FIG. 6, the symbol portion 612 appears as an intended triangle. The symbol unit 316 that is using neural networks 336 trained to predict a complete triangle as its output based multiple portions 716 found in the internal ignorable portion 608 and the symbol portion 712 may not necessarily confuse or result in a bad prediction by the triangle-specific symbol unit 316 because the relevant portions 716 in the symbol portion 612 will enable the neural networks 336 of the triangle symbol unit 316 to generate a relatively accurate predicted symbol (e.g., triangle) based on most of the data captured in the gesture recognition volume 508. A circle-specific neural network 336, however, may struggle to complete as good a predicted symbol (e.g., a circle) based on the same data. Thus, the complete predicted symbol generated by the triangle-specific neural network 336 will be more accurate (and likely produce a better matching score 320 from the triangle symbol unit 316) as compared to the complete predicted symbol generated by the circle-specific neural networks 336. Because the different neural networks 336 are used on the same data of the object path 420, there is no need to have a system that specifically identifies the internal ignorable portion 608 as different from the symbol portion 612. Each symbol unit 316 and the neural networks contained therein will account for the differences between the portions 608, 612 in its own unique way.

With reference now to FIGS. 8A-8D, illustrative operations of the neural networks 336 within the symbol units 316 will be described in accordance with at least some embodiments of the present disclosure. FIG. 8A illustrates a portion 716 of an object path 420 that may be inputted to a neural network 336, for example a neural network 336 that is trained to produce a circle as a complete predicted symbol. The neural network 336 may initially receive the portion 716 of the object path 420 and, based on the coefficients applied to the parameterization of the portion 716, output a complete predicted symbol 804 as shown in FIG. 8B. In some embodiments, this complete predicted symbol 804 is provided to other components of the symbol unit 316 for further processing. In some embodiments, the complete predicted symbol 804 is constructed by the neural network 336 based on the parameterization of the portion 716.

As can be seen in FIG. 8C, the portion 716 and the complete predicted symbol 804 can be compared against the actual object path 420. This comparison can be performed with a neural network 336 using the full actual symbol 324 as the source of the location data points for the actual object path 420. Thus, even though the object path 420 is shown to have started from the bottom right of the gesture recognition volume 508 and does not initially contribute to the formation of the circle. However, the external portion 604 and the ignorable portion 608 are likely ignored with a high degree of confidence by the circle-specific neural network 336. In some embodiments, the circle-specific neural network 336 may be configured to produce, based on the parameterization of the portion 716, a relatively near match for the symbol portion 612 of the object path 420. Given such a close match is made by the circle-specific neural network 336, the gesture recognition instruction set 256 may be configured to output, with a high degree of confidence, a circle as an output symbol for consumption by an application of the computational device 100. Moreover, the portions 604, 608 can effectively be ignored by the gesture recognition instruction set 256 without having to perform a specific analysis of identifying the complete object path 420.

Figure 9B:
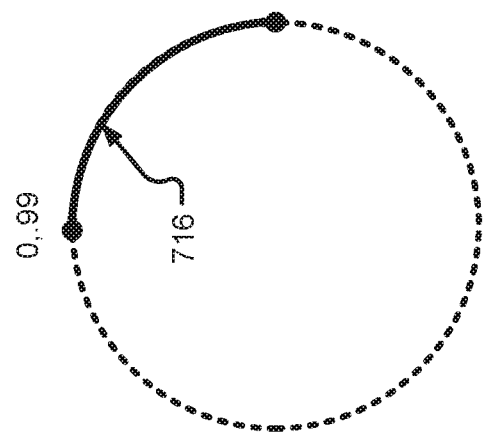
FIG. 9B depicts another illustrative portion of a symbol in accordance with embodiments of the present disclosure.
Figure 9A:
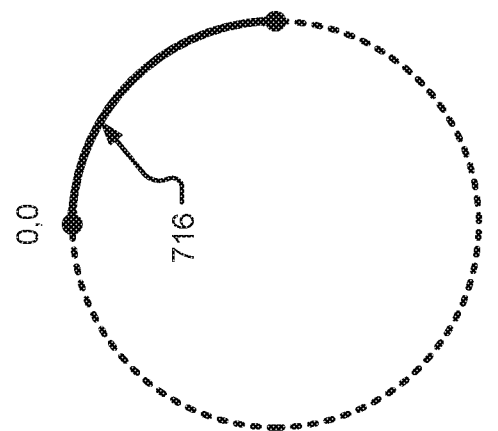
FIG. 9A depicts an illustrative portion of a symbol in accordance with embodiments of the present disclosure.

Based on the previous examples, embodiments of the present disclosure have described neural networks 336 that utilize two values for the parameterization 712 and then draw a complete predicted symbol 804 based on the two-value parameterization. As shown in FIGS. 9A and 9B, the images for the starting parameter 0.0 and 0.99 look very similar. It follows that the training set contains almost similar images with for these two different labels. It may be desirable to avoid this situation since it would confuse the neural network 336.

Embodiments of the present disclosure propose a resolution for the ambiguity in which neural networks 336 for all closed symbols use two parameters for the starting value s=[0,1] with the mapping: x=sin(2*pi*s) and y=cos(2*pi*s).

It can be verified that for the values s=0.0 and s=0.99, the values x,y are almost identical as the corresponding images are also almost identical. Thus, for describing a section of closed symbol, the neural network 336 may be trained with three output parameters, two for the starting point and one describing the length of the section.

Figure 10A:
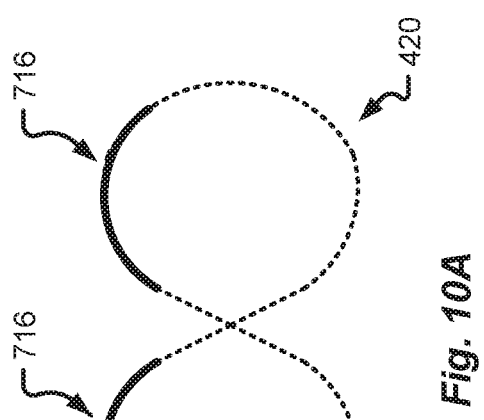
FIG. 10A depicts illustrative portions of another symbol in accordance with embodiments of the present disclosure.

Another source of ambiguities can be situations where the symbol outline has similar sections 716 at different places (e.g., an infinity symbol) as shown in FIG. 10A. Due to the symmetrical nature of the infinity symbol (and other symbols), the left portion 716 and right portion 716 of the symbol are almost identical. To avoid this type of ambiguity, an additional restriction may be imposed onto the infinity-specific neural network 336 (or any other neural network specific to a symbol having similar symmetrical similarities). The restriction may include a restriction that defines all segments on the right side (e.g., x>0) of the object path 420 should remoted from the training dataset.

Embodiments described so far have generally related to symbols that are perfect or nearly perfect. Embodiments of the present disclosure also contemplate compensation for real world drawings by a user that are not perfect or nearly perfect. In some embodiments, a direct image comparison between an expected symbol (e.g., a perfect symbol) and the complete predicted symbol 804 may fail unless thresholds are set to accept large errors; unfortunately, a lenient threshold poses the risk of false positives. Thus, embodiments of the present disclosure propose adding further output parameters to each neural network 336, which reflect possible distortions of the symbol on which that particular neural network 336 is being trained. These additional parameters, reflecting possible distortions, can account for shearing and axis-depending scaling.

Figure 10C:
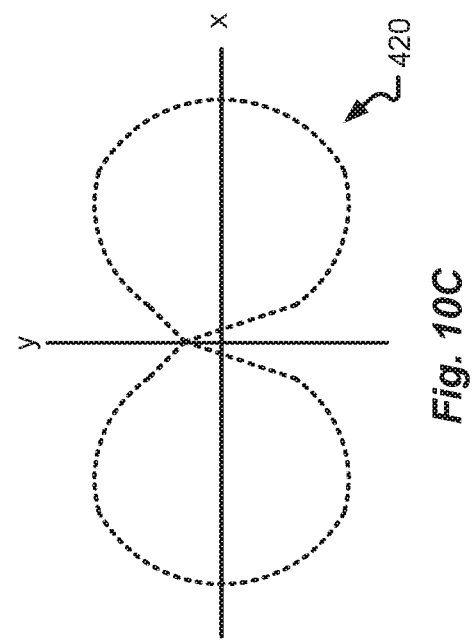
FIG. 10C depicts a second skewed object path for the symbol of FIG. 10A.
Figure 10B:
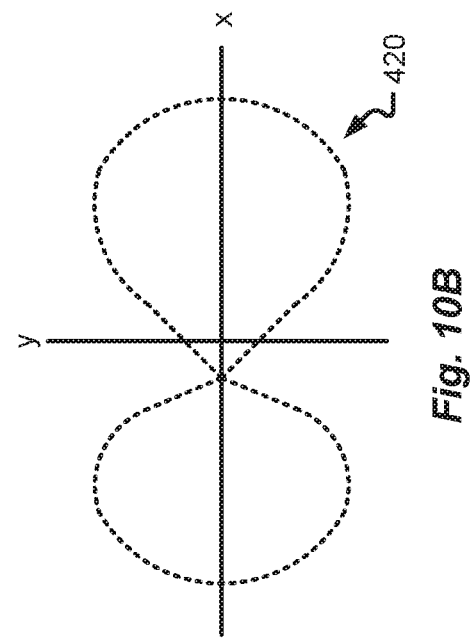
FIG. 10B depicts a first skewed object path for the symbol of FIG. 10A.

FIGS. 10B and 10C depict an example of distorted center shift that may be present for an infinity or other symmetrical symbol. In some embodiments, the center shift may correspond to a shift away from the y-axis, but maintaining symmetry along the x-axis as shown in FIG. 10B. In some embodiments, the center shift may correspond to a shift away from the x-axis, but maintaining symmetry along the y-axis as shown in FIG. 10C. These additional distorted symbols may be useful as part of a training dataset for the infinity-specific symbol unit 316.

Figure 11A:
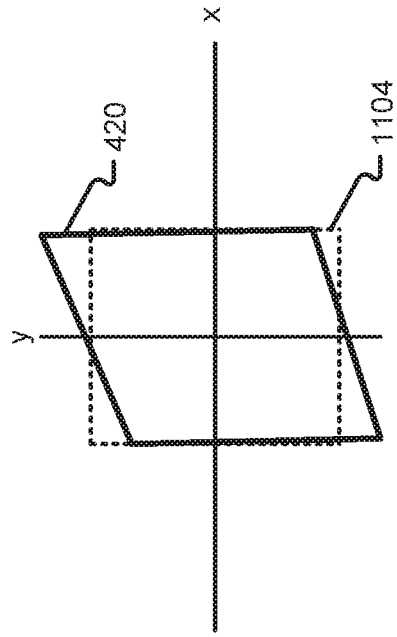
FIG. 11A depicts a first skewed object path relative to another symbol in accordance with embodiments of the present disclosure.
Figure 11B:
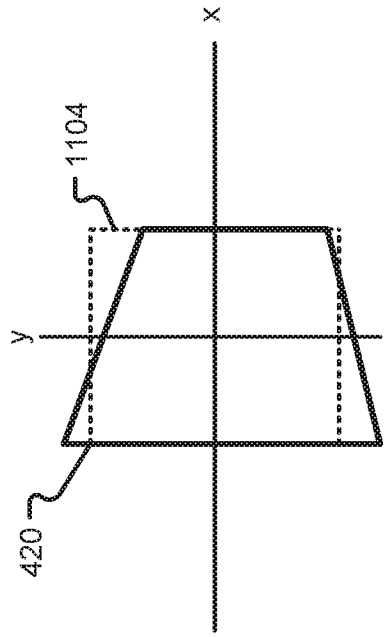
FIG. 11B depicts a second skewed object path relative to the symbol of FIG. 11A.
Figure 11C:
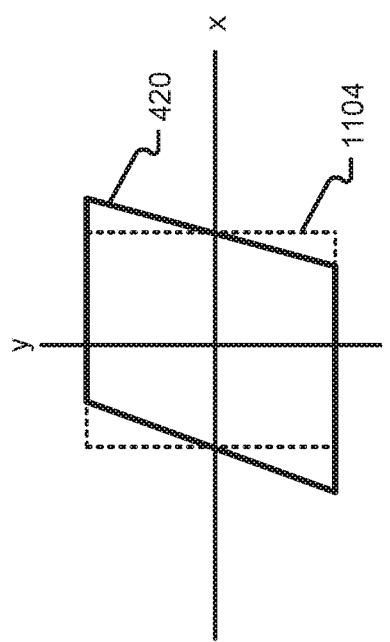
FIG. 11C depicts a third skewed object path relative to the symbol of FIG. 11A.
Figure 11D:
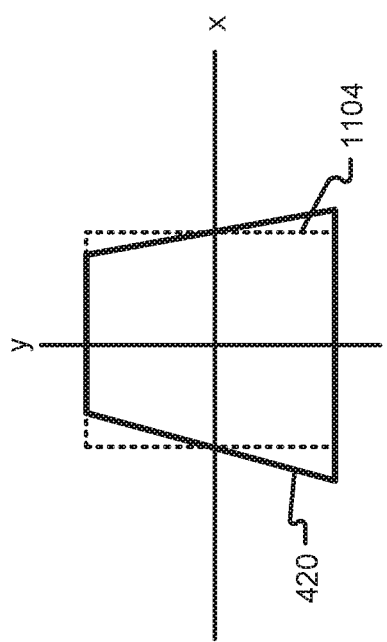
FIG. 11D depicts a fourth skewed object path relative to the symbol of FIG. 11A.

FIGS. 11A-11D depict other examples of possible distortions of an object path 420 relative to an expected object path 1104 for a symbol. Examples of FIGS. 11A and 11B show the effects of a shearing parameter on a square symbol. FIGS. 11C and 11D show the position-dependent scaling that may occur for the same square symbol. Each of these different distorted symbols may be provided to a square-specific neural network 336 as a training dataset to enable the square-specific neural network 336 to account for and accommodate imperfect user inputs and distorted or shifted object paths 320.

Another potential that may exist for certain neural networks is the possible similarity of one symbol and another symbol. For example, a left half and right half of an infinity symbol may be recognized as a circle by a circle-specific neural network. Drawing the left half or right half of the infinity symbol is very similar to drawing a circle. Thus, when the drawing of the infinity is started at the center and continued to reach the center again. This particular situation may result in a confusion by the circle-specific neural network 336 because a circle may be recognized before the user is allowed to complete the infinity symbol. This particular problem can be solved by adjusting an update factor for the circle-specific neural network 336. The update factor, if increased to a value greater than one, may require the user to redraw or overdraw the circle a predetermined number of times that is more than one. For instance, an update factor for the circle-specific neural network 336 may be set to three, thereby requiring the user to redraw the circle three times before recognition is completed. Because the circle is so similar to a portion of the infinity symbol, the adjustment of the circle-specific neural network 336 should be sufficient to avoid confusion between the symbols. Similar update factors may be adjusted for other neural networks 336 if such neural networks are at risk of detecting one symbol while another symbol is not yet completed.

Yet another possible issue that can be addressed with embodiments of the present disclosure is the problem associated with similar symbols. For instance, as shown in FIG. 12A, an expected object path 1104 for a first symbol (e.g., a semi-circle) may be similar to a second expected object path 1204 for a second symbol (e.g., a circle). Likewise, as shown in FIG. 12B, the two expected object paths 1104, 1204 for a triangle and crown may be similar to one another.

At a first glance the circle and the semicircle look very different. But when these symbols are scaled on top of each other, the differences are less apparent. In case that both should be used in a game or application, the recognition can be improved by limiting the scaling to preserve the original aspect ratio. Small deviations to the original aspect ratio could be beneficial. For instance, for the semicircle which has an aspect ratio of 0.5 one might allow to scale to an aspect ratio in [0.2,0.8]. Thus, a semicircle scaled like in FIG. 12A would be disqualified because of not meeting the aspect ratio range.

Figure 12B:
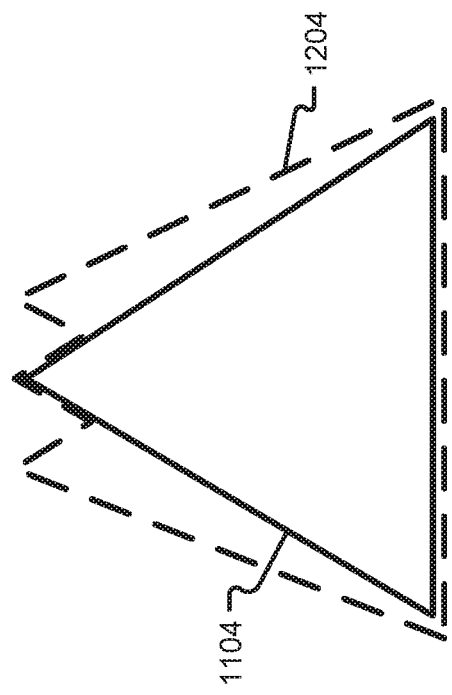
FIG. 12B depicts two more similar, but different, symbols in accordance with embodiments of the present disclosure.
Figure 12A:
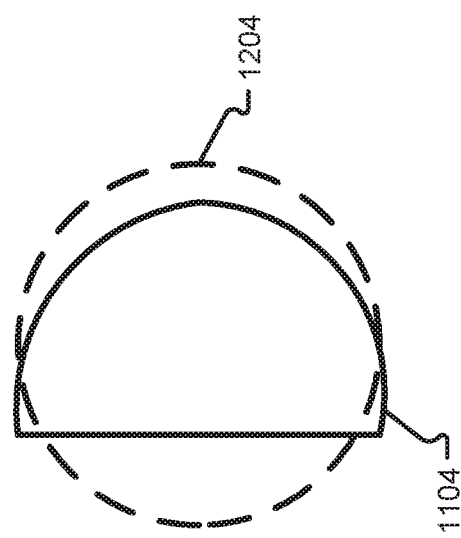
FIG. 12A depicts two similar, but different, symbols in accordance with embodiments of the present disclosure.

In the example of FIG. 12B, the axis-dependent scaling renders the crown and the triangle almost similar. The top of the crown with the details is scaled too small that the details become less relevant. To avoid a triangle recognized as crown like in FIG. 12B, an option is to limit the distortion parameter range to exclude to obstructive distortions and to retain the upper part of the crown.

Embodiments of the present disclosure also contemplate enabling the addition of new symbols. This may be accomplished by training a new neural network 336 with a new training dataset. In some embodiments, the training dataset can be generated out of the polygon of the new symbol by sampling different fractions and obtaining the corresponding parameters. The advantage of this approach is that there is no need to retrain the existing neural networks 336 since each neural network 336 only operates for its specific symbol. The scaling and adding of further neural networks 336, vis-à-vis new symbol units 316, to the plurality of symbol units 312 is relatively easy given the simplicity of the parameterizations used and the simple outputs of the neural networks 336 corresponding to complete predicted symbols 804.

Embodiments of the present disclosure provide robust methods to detect gestures from a continuous movement of an object 404. The approaches disclosed herein do not rely on a defined starting or endpoint, instead gestures and symbols are detected on the fly. The methods can handle both open and closed symbols and do not depend on dynamic properties, such as drawing speed or imperfections. This is contrasted with gesture recognition algorithms of the prior art. Gesture recognition toolkits of the prior art, for example, focus on short dynamic gestures. The described approach handles drawings and gestures which usually take more time to complete and are more complex in structure than simple gestures (e.g., a swipe gesture).

With reference now to FIGS. 13-16, various methods of performing gesture recognition and/or operating a computational device 100 in connection with performing gesture recognition will be described in accordance with at least some embodiments of the present disclosure. It should be appreciated that any step or steps from one method described herein may be used in connection with or in combination with any other method described herein. Moreover, the order of operations depicted and described in connection with any particular method should not be construed as limiting embodiments of the present disclosure.

Figure 13:
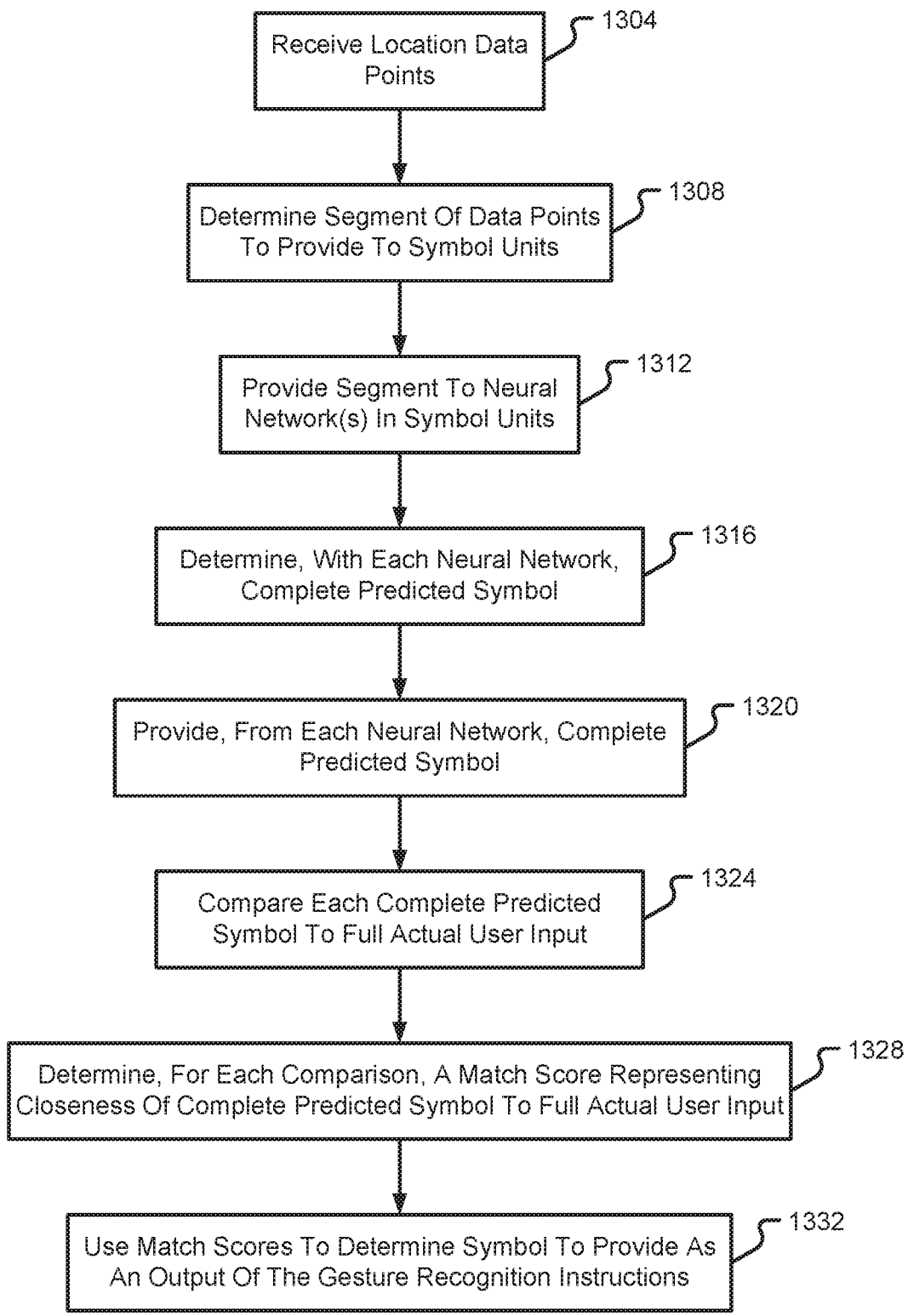
FIG. 13 depicts a first method in accordance with embodiments of the present disclosure.

Referring initially to FIG. 13, a first method will be described in accordance with at least some embodiments of the present disclosure. The method begins when location data points are received at a segment recognition instruction set 244 (step 1304). The location data points may be received from the object tracking instruction set 240 and may correspond to a number of location data points along an object path 420.

The location data points are used to determine a portion 716 or segment of the total object path 420 to provide to the plurality of neural networks 312 (step 1308). The method continues by providing the portion 716 or segment to each symbol unit 316 in the plurality of symbol units (step 1312). The location data portions may be provided to each of the symbol units 316 in parallel.

Thereafter, the symbol unit 316 invokes its neural networks 336 to determine a complete predicted symbol 804 (step 1320). Each of the complete predicted symbols 804 may vary from one another because the neural networks 336 of each symbol unit 316 may be trained on different symbols and may be configured to provide different types of complete predicted symbols 804 from one another.

Each of the complete predicted symbols 804 may be outputted from the neural networks 336, resulting in each symbol unit 316 generating a particular match score 320, which is provided to the symbol selection engine 324 (step 1320). As mentioned above, each symbol unit 316 may generate the matching score 320 with a comparison engine 344, where a comparison can be performed between each complete predicted symbol 804 and the full actual symbol 324 obtained from the user input (step 1324). The matching scores 320 produced by each symbol unit 316 may represent a closeness of the complete predicted symbol 804 to the full actual symbol 324 (step 1328). Based on the various match scores 320, the symbol selection engine 324 may select a closest complete predicted symbol 804 as an output 328 to an application (step 1332). As a non-limiting example, the application that receives the output 328 may correspond to the gaming application instructions 260.

Figure 14:
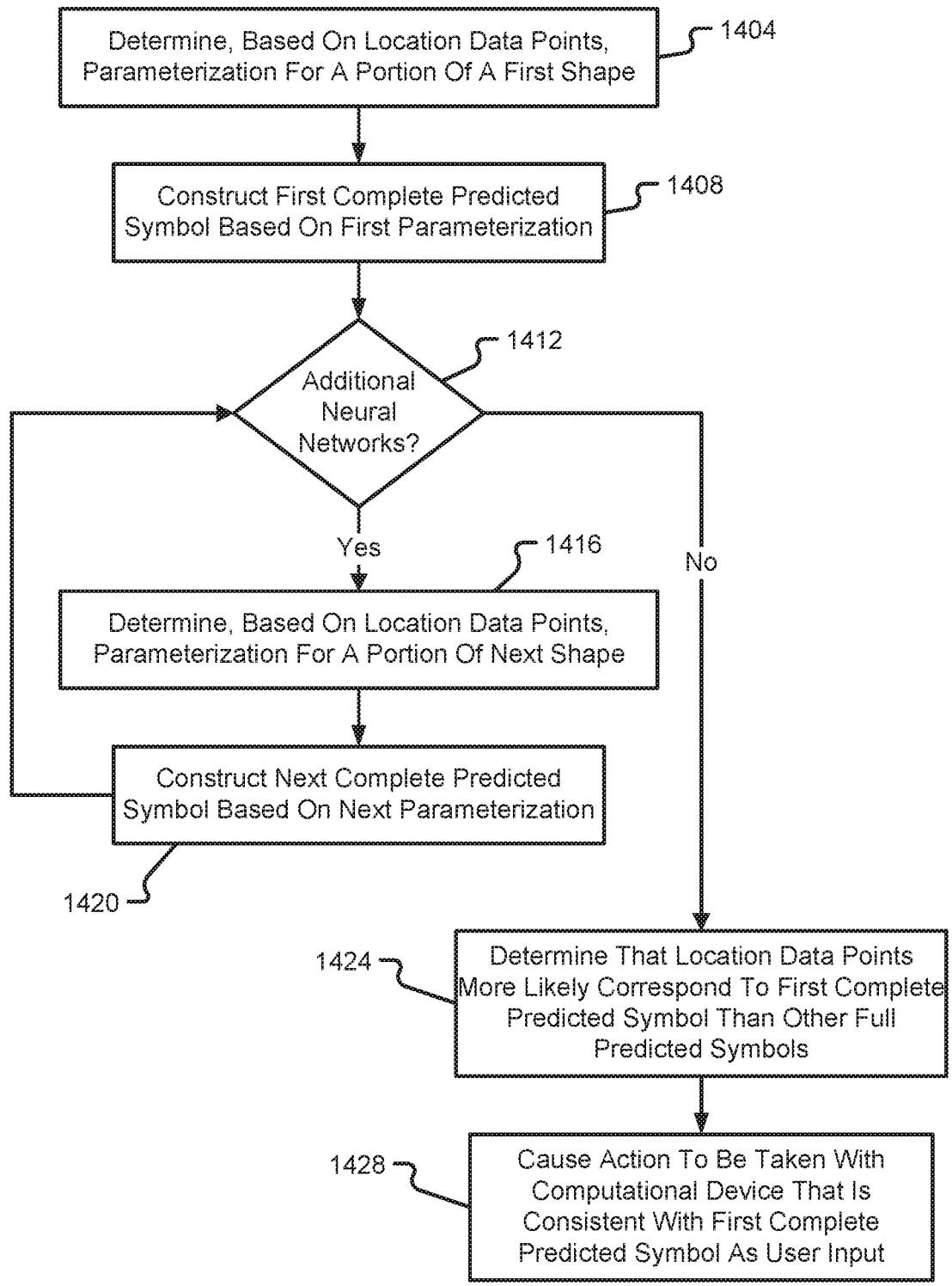
FIG. 14 depicts a second method in accordance with embodiments of the present disclosure.

With reference now to FIG. 14, another method will be described in accordance with at least some embodiments of the present disclosure. The method begins by determining, based on the location data points, a parameterization for a portion of a first symbol (step 1404). In some embodiments, the parameterization may for the portion of the first symbol may be calculated by a first neural network 336. Thereafter, the method continues by constructing, with the first neural network 336, a first complete predicted symbol 804 based on the first parameterization (step 1408). As can be appreciated, the size, contours, and dimensions of the first complete predicted symbol 804 may depend upon the type of neural network 336 being used to generate the complete predicted symbol 804 as well as the parameterization generated by the neural network 336.

The method continues by determining if additional neural networks 316 will also be used to process the location data points (step 1412). It should be appreciated that step 1412 may be performed prior to step 1404 or in parallel therewith. The depiction of step 1412 being after step 1408 is simply for ease of discussion.

If the query of step 1412 is answered affirmatively, then the method continues by determining, based on the location data points, a different parameterization for a portion of another symbol (step 1416) and then constructing a next complete predicted symbol 804 based on the parameterization generated in step 1416 (step 1420). Step 1416 and 1420 may be repeated for each of the neural networks 336 (likely within different symbol units 316) until each of the neural networks generates a complete predicted symbol 804 from the same set of location data points.

Once the query of step 1412 is answered negatively, the method continues by determining that the location data points more likely correspond to the first complete predicted symbol 804 as compared to the other complete predicted symbols 804 generated in steps 1416 and 1420 (step 1424). This particular determination may be made with reference to a full actual symbol 324 or some other actual input representing the object path 420. The method continues by causing an action to be taken with the computational device 100 that is consistent with the first complete predicted symbol 804 (step 1428). In some embodiments, the first complete predicted symbol 804 may be used as the output 328 that is provided to an application of the computational device 100, such as the gaming instruction set 260.

Figure 15:
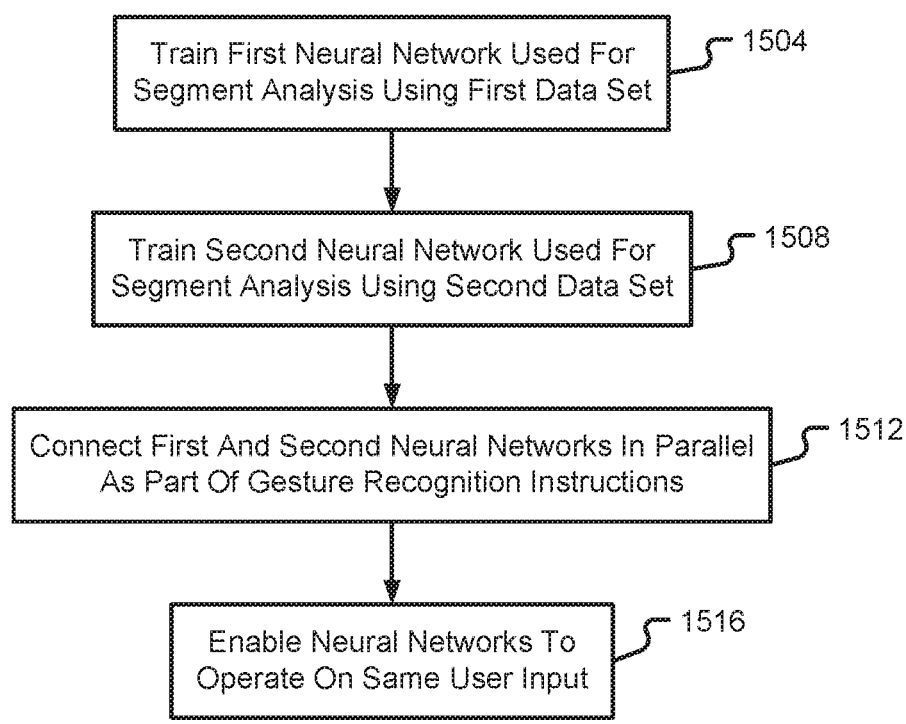
FIG. 15 depicts a third method in accordance with embodiments of the present disclosure.

With reference now to FIG. 15, another method will be described in accordance with at least some embodiments of the present disclosure. The method begins by training a first neural network 336 using a first training dataset (step 1504). In some embodiments, the first neural network 336 may be trained to generate a complete predicted symbol of a first type and, therefore, may be trained using symbols that are consistent, but perhaps not identical, to the symbol of the first type. The training dataset may be computer generated and may include skewed or purposefully imperfect data to assist with the training of a flexible neural network 336.

The method continues by training a second neural network 336 with a second training dataset (step 1508). In some embodiments, the training of the second neural network 336 may be similar to the training of the first neural network 336, but the second neural network 336 is trained to compute a different type of complete predicted symbol 804 as compared to the first neural network 336. In other words, the second neural network 336 may be trained to operate as a different type of neural network from the first neural network 336.

The method continues by connecting the first neural network 336 and second neural network 336 in parallel with one another (step 1512). In some embodiments, this step may involve incorporating one neural network into a first type of symbol unit 316 and incorporating the other neural network into a second type of symbol unit 316. The symbol units 316 may then be connected in parallel with one another to enable each symbol unit 316 to operate on the same user input segment or, more specifically, the same portion 716 or segment selected from an object path 420 (step 1516).

Figure 16:
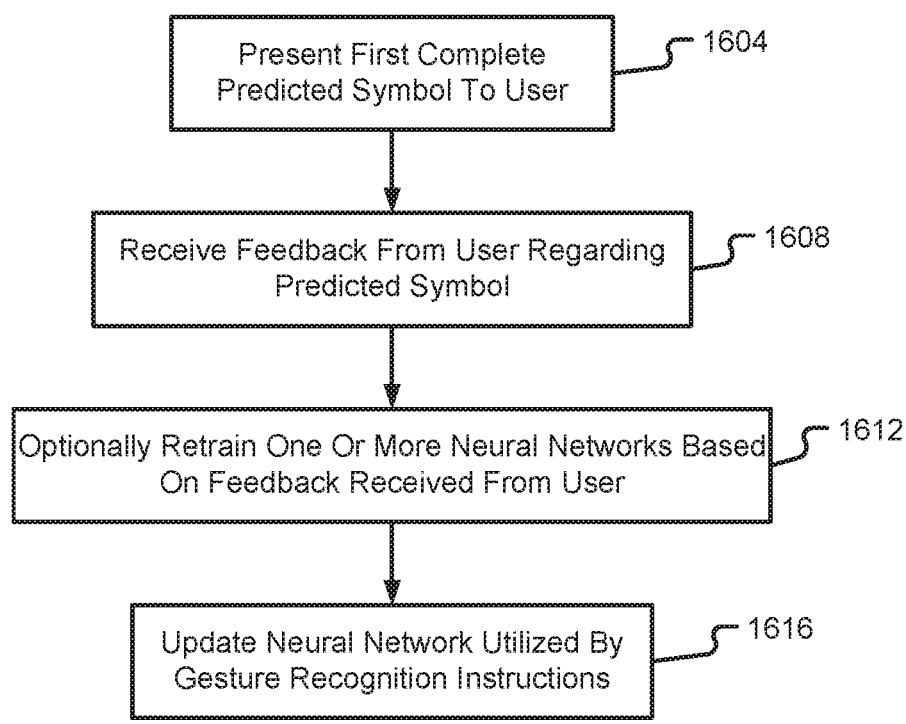
FIG. 16 depicts a fourth method in accordance with embodiments of the present disclosure.

With reference now to FIG. 16, another method will be described in accordance with at least some embodiments of the present disclosure. The method begins by presenting a first complete predicted symbol 804 to a user (step 1604). In some embodiments, the first complete predicted symbol 804 may correspond to an output of a neural network 336. The method continues by receiving feedback from a user regarding the first complete predicted symbol 804 (step 1608). The feedback may correspond to a positive or negative feedback indicating a closeness of the first complete predicted symbol 804 to the symbol that was desired as an input by the user. This feedback may be provided to the learning engine as part of other training feedback used to train or retrain the neural network 336.

Thereafter, the method continues by optionally retraining the neural network 336 that provided the first complete predicted symbol 804 (step 1612). In some embodiments, the retraining is performed based on the feedback received from the user, possibly in combination with other training feedback. The method may then optionally include updating the neural network if the retraining resulted in a significantly different behavior for the neural network (step 1616). In some embodiments, the neural network may be updated such that it can be used for late gesture recognition operations as described herein.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The invention is claimed as follows:

1. A method of operating a computational device, the method comprising:
    receiving, from a sensor device, location data points corresponding to movement of an object in three-dimensional space relative to the sensor device;
    determining, based on the location data points and with a processor, a first parameterization for a portion of a first symbol, wherein the first symbol corresponds to a first user input for the computational device;
    determining, based on the location data points and with the processor, a second parameterization for a portion of a second symbol, wherein the second symbol corresponds to a second user input for the computational device, wherein the first symbol is different from the second symbol, and wherein the first user input is different from the second user input;
    constructing, with the processor, a first complete predicted symbol based on the first parameterization;
    constructing, with the processor, a second complete predicted symbol based on the second parameterization;
    determining, with the processor, that the location data points match the first complete predicted symbol more closely than the second complete predicted symbol; and
    causing an action to be taken with the computational device consistent with the first user input based on determining that the location data points match the first complete predicted symbol more closely than the second complete predicted symbol.

2. The method of claim 1, further comprising:
    comparing, with the processor, the first complete predicted symbol with the location data points received from the sensor device;
    determining, with the processor and based on the comparison of the first complete predicted symbol with the location data points received from the sensor device, a first matching score that represents the location data points corresponding to the first symbol;
    comparing, with the processor, the second complete predicted symbol with the location data points received from the sensor device;
    determining, with the processor and based on the comparison of the second complete predicted symbol with the location data points received from the sensor device, a second matching score that represents the location data points corresponding to the second symbol;
    determining, with the processor, that the first matching score is greater than the second matching score; and
    based on determining that the first matching score is greater than the second matching score, determining that the first user input will be used to cause the action.

3. The method of claim 2, wherein the portion of the first symbol comprises less than half the first complete predicted symbol and wherein the portion of the second symbol comprises less than half the second complete predicted symbol.

4. The method of claim 2, wherein the first complete predicted symbol corresponds to a first two-dimensional symbol and wherein the second complete predicted symbol corresponds to a second two-dimensional symbol.

5. The method of claim 4, wherein the first two-dimensional symbol and the second two-dimensional symbol are both used as inputs to an application executed by the computational device.

6. The method of claim 5, wherein the application comprises a gaming application and wherein the second user input causes the gaming application to perform a second action to be taken with the computational device that is different from the action taken with the computational device consistent with the first user input.

7. The method of claim 2, further comprising:
    applying a first neural network to the location data points to construct the first parameterization;
    applying a second neural network to the location data points to construct the second parameterization, wherein the second neural network is applied in parallel with the first neural network;
    applying a third neural network to the first parameterization and the second parameterization; and
    outputting, from the third neural network, the first complete predicted symbol and the second complete predicted symbol.

8. The method of claim 7, wherein the first neural network is trained with a first data set comprising different portions of the first symbol and wherein the second neural network is trained with a second data set comprising different portions of the second symbol.

9. The method of claim 1, further comprising:
    presenting the first complete predicted symbol to a user of the computational device prior to causing the action to be taken with the computational device;
    receiving a confirmation from the user of the computational device that the first complete predicted symbol corresponds to a desired input of the user of the computational device; and
    in response to receiving the confirmation, causing the action to be taken with the computational device that is consistent with the first user input.

10. The method of claim 9, further comprising:
    in response to receiving the confirmation, providing the location data points to a neural network as a training data set for determining the first complete predicted symbol and for determining the first parameterization.

11. The method of claim 1, wherein the sensor device comprises an image sensor that captures a plurality of images of the object, the method further comprising:
analyzing, with the processor, the plurality of images to determine a motion of the object in the three-dimensional space relative to the sensor device over a predetermined amount of time.

12. The method of claim 1, wherein the object comprises an anatomical feature of a user of the computational device.

13. A system, comprising:
a processor;
a computer-readable storage medium, coupled with the processor, comprising instructions that are executable by the processor, wherein the instructions comprise:
instructions that receive location data points corresponding to movement of an object in three-dimensional space relative to a sensor device;
instructions that determine, based on the location data points, a first parameterization for a portion of a first symbol, wherein the first symbol corresponds to a first user input for a computational device;
instructions that determine, based on the location data points, a second parameterization for a portion of a second symbol, wherein the second symbol corresponds to a second user input for the computational device, wherein the first symbol is different from the second symbol, and wherein the first user input is different from the second user input;
instructions that construct a first complete predicted symbol based on the first parameterization;
instructions that construct a second complete predicted symbol based on the second parameterization;
instructions that determine that the location data points correspond to the first complete predicted symbol more closely than the second complete predicted symbol; and
instructions that provide the first user input to the computational device based on determining that the location data points correspond to the first complete predicted symbol more closely than the second complete predicted symbol.

14. The system of claim 13, wherein the instructions further comprise:
instructions that compare the first complete predicted symbol with the location data points received from the sensor device;
instructions that determine, based on the comparison of the first complete predicted symbol with the location data points received from the sensor device, a first matching score that represents the location data points corresponding to the first symbol;
instructions that compare the second complete predicted symbol with the location data points received from the sensor device;
instructions that determine, based on the comparison of the second complete predicted symbol with the location data points received from the sensor device, a second matching score that represents the location data points corresponding to the second symbol; and
instructions that determine that the first matching score is greater than the second matching score.

15. The system of claim 13, wherein the instructions further comprise:
a first neural network that constructs the first parameterization based on the location data points; and
a second neural network that constructs the second parameterization based on the location data points.

16. The system of claim 15, wherein the instructions further comprise:
a third neural network that receives the first parameterization and the second parameterization as inputs and, based on the inputs, generates an output that comprises the first complete predicted symbol and the second complete predicted symbol.

17. The system of claim 16, wherein the first complete predicted symbol comprises two straight edges connected at a vertex and wherein the second complete predicted symbol comprises a curved feature.

18. The system of claim 16, wherein the first complete predicted symbol comprise a curved feature and wherein the second complete predicted symbol also comprises the curved feature.

19. A computational device, comprising:
a user interface comprising a user input and user output;
a sensor device;
a processor coupled with the user interface and with the sensor device; and
a computer-readable storage medium, coupled with the processor, comprising instructions that are executable by the processor, wherein the instructions comprise:
instructions that receive location data points corresponding to a gesture of a user provided relative to the sensor device;
instructions that determine, based on the location data points, a first parameterization for a portion of a first symbol, wherein the first symbol corresponds to a first user input for the computational device;
instructions that determine, based on the location data points, a second parameterization for a portion of a second symbol, wherein the second symbol corresponds to a second user input for the computational device, wherein the first symbol is different from the second symbol, and wherein the first user input is different from the second user input;
instructions that construct a first complete predicted symbol based on the first parameterization;
instructions that construct a second complete predicted symbol based on the second parameterization;
instructions that determine that the location data points match the first complete predicted symbol more closely than the second complete predicted symbol; and
instructions that select the first user input as an input to an application based on determining that the location data points match the first complete predicted symbol more closely than the second complete predicted symbol.

20. The computational device of claim 19, wherein the sensor device comprises an image sensor that captures a plurality of images of the user, wherein the instructions further comprise:
instructions that analyze the plurality of images to determine a motion of the user relative to the sensor device over a predetermined amount of time;
instructions that compare the first complete predicted symbol with the location data points received from the sensor device;
instructions that determine, based on the comparison of the first complete predicted symbol with the location data points received from the sensor device, a first matching score that represents the location data points corresponding to the first symbol;

instructions that compare the second complete predicted symbol with the location data points received from the sensor device;

instructions that determine, based on the comparison of the second complete predicted symbol with the location data points received from the sensor device, a second matching score that represents the location data points corresponding to the second symbol; and instructions that determine that the first matching score is greater than the second matching score.

* * * * *